(12) United States Patent
Kawashiri et al.

(10) Patent No.: US 8,371,408 B2
(45) Date of Patent: Feb. 12, 2013

(54) BONNET STRUCTURE

(75) Inventors: Shinya Kawashiri, Osaka (JP); Yutaka Matsui, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 13/143,885

(22) PCT Filed: Dec. 10, 2009

(86) PCT No.: PCT/JP2009/070664
§ 371 (c)(1),
(2), (4) Date: Jul. 8, 2011

(87) PCT Pub. No.: WO2010/079667
PCT Pub. Date: Jul. 15, 2010

(65) Prior Publication Data
US 2011/0272202 A1  Nov. 10, 2011

(30) Foreign Application Priority Data
Jan. 9, 2009  (JP) .................................. 2009-003939

(51) Int. Cl.
*B62D 25/10* (2006.01)
(52) U.S. Cl. ................................... 180/69.21; 180/89.17
(58) Field of Classification Search ................. 180/68.3, 180/69.2, 69.21, 89.17
See application file for complete search history.

(56) References Cited

U.S. PATENT DOCUMENTS

| | | | | |
|---|---|---|---|---|
| 4,126,199 A | * | 11/1978 | Hansen et al. ............... | 180/68.3 |
| 6,030,029 A | * | 2/2000 | Tsuda et al. ............. | 296/203.02 |
| 6,318,450 B1 | * | 11/2001 | Acre ............................... | 165/67 |
| 7,418,994 B2 | | 9/2008 | Evans et al. | |
| 7,475,750 B2 | * | 1/2009 | Tokuhara ...................... | 180/69.2 |
| 2004/0262061 A1 | * | 12/2004 | Bahr et al. ................... | 180/69.2 |
| 2005/0211487 A1 | * | 9/2005 | Obe et al. ................... | 180/69.21 |

FOREIGN PATENT DOCUMENTS

| | | | |
|---|---|---|---|
| JP | 56-111017 | | 8/1981 |
| JP | 57-25076 | | 2/1982 |
| JP | 02128918 A | * | 5/1990 |
| JP | 2756344 B2 | | 5/1998 |
| JP | 11-93664 | | 4/1999 |

OTHER PUBLICATIONS

English Translation of the International Preliminary Report on Patentability including the Written Opinion of the International Searching Authority for PCT/JP2009/070664, dated Aug. 25, 2011, 10 pages.
International Search Report for International Application No. PCT/JP2009/070664 mailed Feb. 16, 2010, 7 pgs.

* cited by examiner

*Primary Examiner* — J. Allen Shriver, II
*Assistant Examiner* — Bridget Avery
(74) *Attorney, Agent, or Firm* — Sterne, Kessler, Goldstein & Fox, P.L.L.C.

(57) ABSTRACT

A bonnet structure including a bonnet flange extending inward from an inner peripheral surface of a bonnet is positioned farther toward a first direction, which is opposite in a vehicle longitudinal direction to a rotary shaft for the bonnet, than shroud flanges extending outward from side surfaces of a shroud main body when the bonnet is located at a closed position. A first elastic sealing member mounted to the bonnet flange is brought from the first direction into contact with anteroposterior contact surfaces of the shroud flanges that face to the first direction when the bonnet is rotated about the rotary shaft from the opened position to the closed position. It is possible to effectively prevent an excessive abrasion and a detachment of elastic sealing members for sealing a gap between the bonnet and the shroud.

9 Claims, 16 Drawing Sheets

Fig. 8
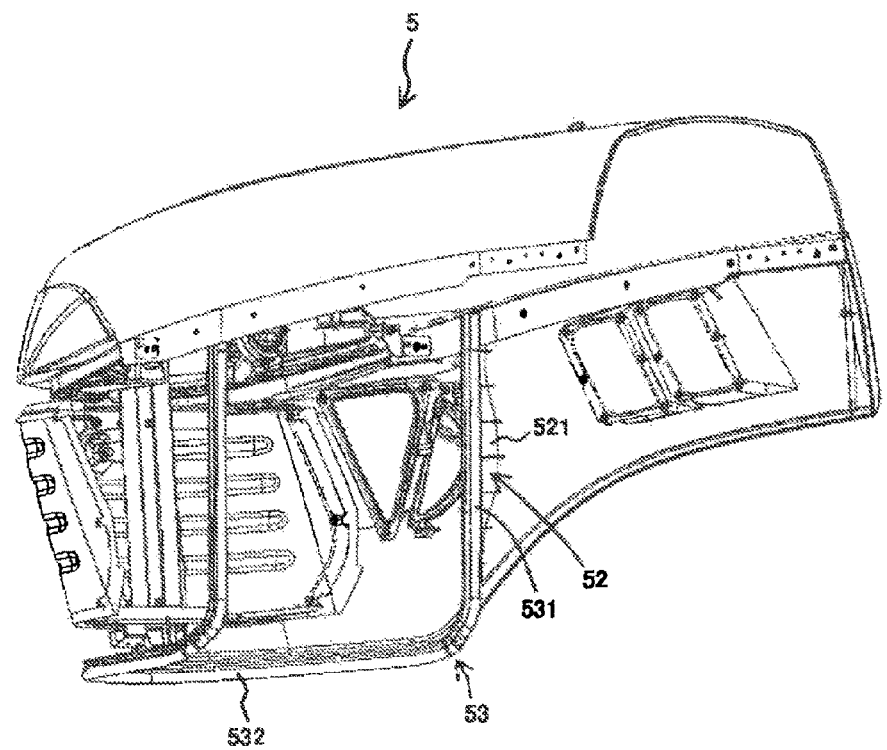
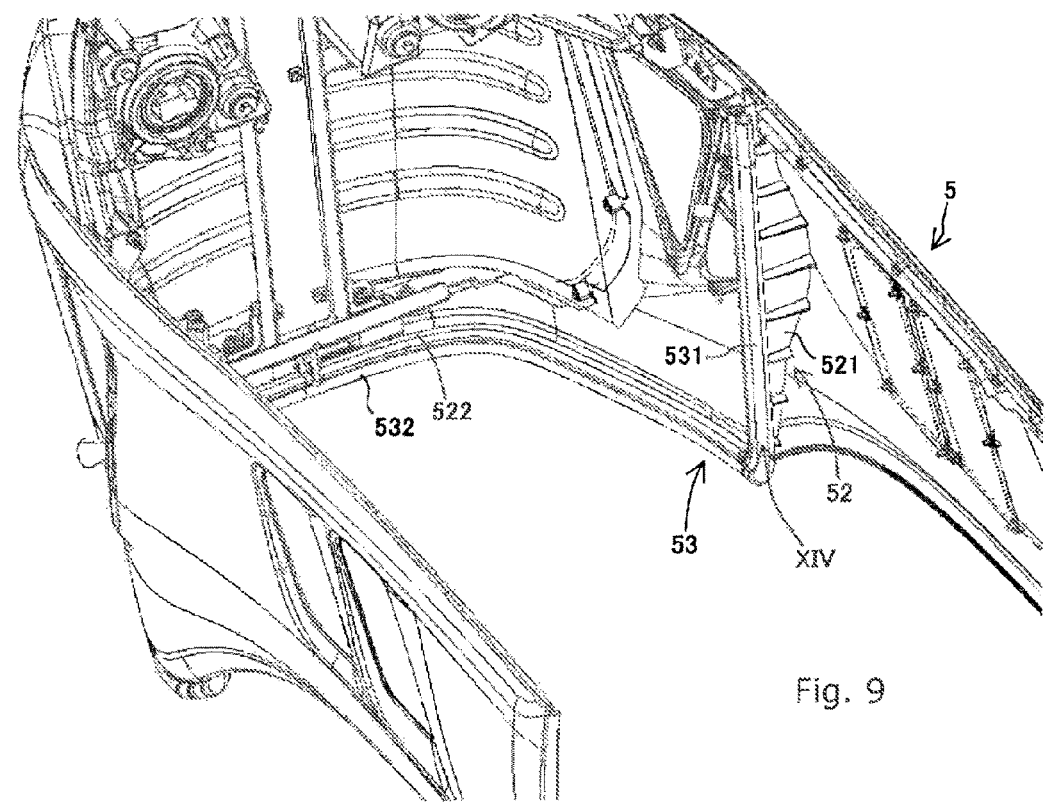
Fig. 9

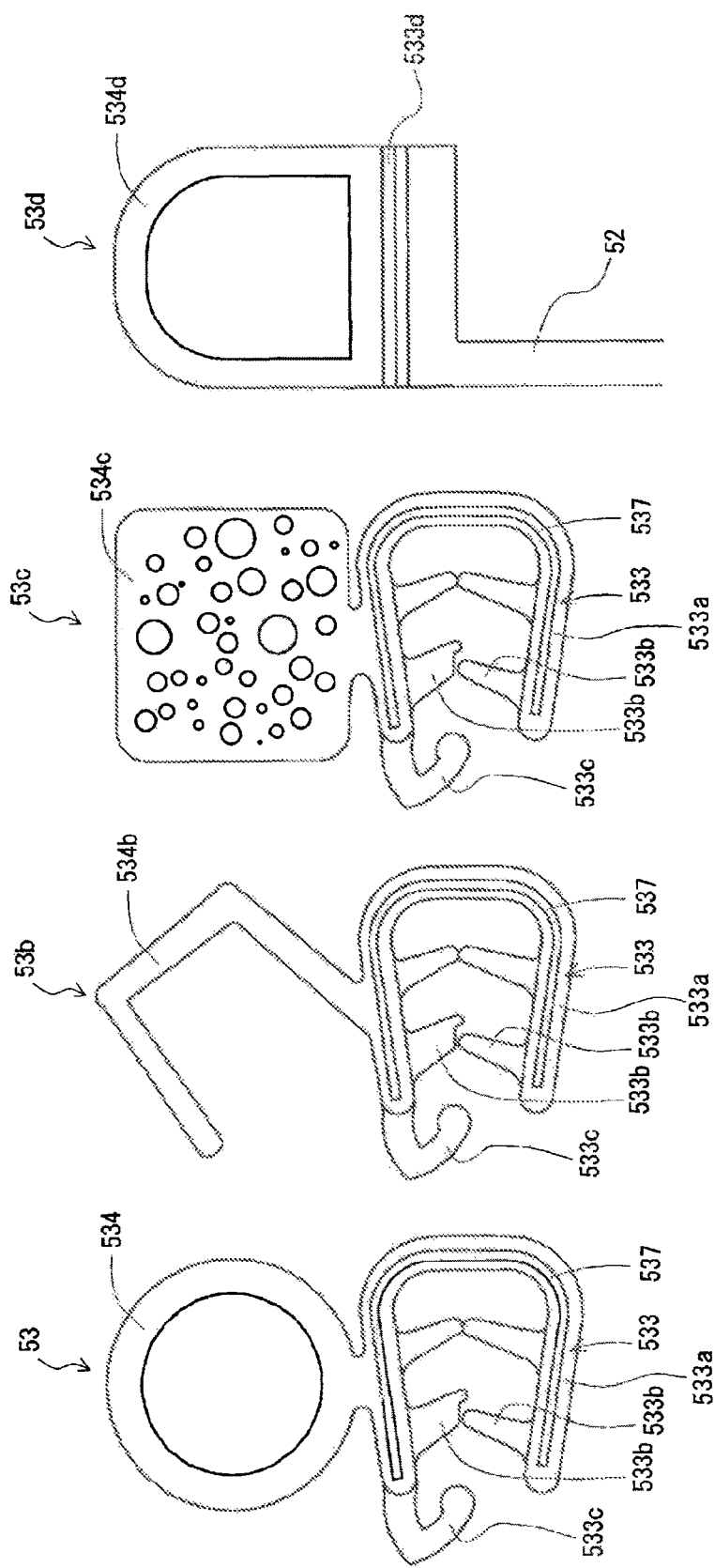

BONNET STRUCTURE

FIELD OF THE INVENTION

The present invention relates to a bonnet (bonnet) structure applicable to a working vehicle including a radiator, a cooling fan and an engine, which are disposed in order from a front to a rear of the vehicle, a shroud that surrounds the cooling fan, an air cleaner that is disposed in front of the shroud, an intake pipe that has a first end connected to the air cleaner and a second end connected to an inlet port of the engine, and a bonnet that is rotatable about a rotary shaft along a vehicle width direction so as to be located at a closed position for covering these members and at an opened position for exposing these members.

BACKGROUND ART

There has been a working vehicle including a radiator, a cooling fan and an engine, which are disposed in order from the front to the rear of the vehicle, a shroud that surrounds the cooling fan, an air cleaner that is disposed in front of the shroud, an intake pipe that has a first end connected to the air cleaner and a second end connected to an inlet port of the engine, and a bonnet that is rotatable about a rotary shaft along a vehicle width direction so as to be located at a closed position for covering these members and at an opened position for exposing these members. In such a working vehicle, it is desirable that an inner space of the bonnet is divided in a sealing manner into front and rear sides of the shroud in a vehicle longitudinal direction when the bonnet is located at the closed position.

More specifically, if the inner space of the bonnet is separated in an airtight manner into the front and rear sides of the shroud in the vehicle longitudinal direction, the cooling air flowing from the cooling fan toward the engine and cooling the engine thereby to be wormed can be effectively prevented from returning to the radiator. Prevented therefore is the reduction in cooling efficiency by the radiator and the cooling fan.

In this regard, there has been proposed a bonnet structure having a following configuration (see patent document 1 which is mentioned below). In the bonnet structure, a shroud is provided on the outer peripheral surface with an integrally projecting edge, and an elastic sealing member (hereinafter, referred to as a shroud-side elastic sealing member) is attached to the projecting edge. The bonnet is provided on an inner peripheral surface with an elastic sealing member (hereinafter, referred to as a bonnet-side elastic sealing member), and an inner peripheral surface of the bonnet-side elastic sealing member is brought into contact with the outer peripheral surface of the shroud-side elastic sealing member when the bonnet is located at the closed position.

In the bonnet structure described in Patent Document 1, since the gap between the shroud surrounding the cooling fan and the bonnet is sealed by the shroud-side elastic sealing member and the bonnet-side elastic sealing member, the inner space of the bonnet can be separated into the front and rear sides by the shroud since. The bonnet structure is therefore useful in that it can prevent reduction in cooling efficiency by the radiator and the cooling fan. However, the bonnet structure still has possibility for improvement on the following points.

More specifically, in the bonnet structure described in Patent Document 1, when the bonnet is located at the closed position, the inner peripheral surface of the bonnet-side elastic sealing member provided onto the bonnet is brought into contact with the outer peripheral surface of the shroud-side elastic sealing member provided onto the shroud.

in such a configuration, the bonnet-side elastic sealing member is come close and spaced apart from above with respect to a portion (hereinafter, referred to as an upper portion of the shroud-side elastic sealing member) of the shroud-side elastic sealing member that corresponds to the upper surface of the shroud in accordance with the opening and closing motion of the bonnet, so that the inner peripheral surface of the bonnet-side elastic sealing member is brought into contact with the outer peripheral surface of the upper portion of the shroud-side elastic sealing member when the bonnet is located at the closed position.

Accordingly, the upper portion of the shroud-side elastic sealing member is not in friction with the corresponding portion of the bonnet-side elastic sealing member while the bonnet is being opened and closed.

However, the bonnet-side elastic sealing member is come close and spaced apart from forward with respect to portions (hereinafter, referred to as side portions of the shroud-side elastic sealing member) of the shroud-side elastic sealing member that correspond to side surfaces of the of the shroud in accordance with the opening and closing motion of the bonnet, so that the inner peripheral surface of the bonnet-side elastic sealing member is brought into contact with the outer peripheral surfaces of the side portions of the shroud-side elastic sealing member when the bonnet is located at the closed position.

More specifically, the side portions of the shroud-side elastic sealing member are in friction with the corresponding portions of the bonnet-side elastic sealing member while the bonnet is being opened and closed. This results in defects such as excessive abrasion of the shroud-side elastic sealing member and/or the bonnet-side elastic sealing member, and detachment of the shroud-side elastic sealing member and/or the bonnet-side elastic sealing member from the shroud and/or the bonnet in some cases.

PRIOR ART DOCUMENT

Patent Document

Patent document 1: Japanese Patent No. 2756344

DISCLOSURE OF THE INVENTION

The present invention has been achieved in view of these problems of the conventional art, and it is an object thereof to provide a bonnet structure applied to a working vehicle including a radiator, a cooling fan, and an engine, which are disposed in order from the front to the rear of the vehicle, a shroud that surrounds the cooling fan, an air cleaner that is disposed in front of the shroud, an intake pipe that has a first end connected to the air cleaner and a second end connected to an inlet port of the engine, and a bonnet that is rotatable about a rotary shaft along a vehicle width direction so as to be located at a closed position for covering these members and at an opened position for exposing these members, the bonnet structure being capable of effectively preventing the excessive abrasion and the detachment of elastic sealing members for sealing the gap between the bonnet and the shroud when the bonnet is located at the closed position.

In order to achieve the object, the present invention provides a bonnet structure applicable to a working vehicle including a radiator, a cooling fan and an engine, which are disposed in order from a front to a rear of the vehicle, a shroud that surrounds the cooling fan, an air cleaner that is disposed in front of the shroud, an intake pipe that has a first end connected to the air cleaner and a second end connected to an inlet port of the engine, and a bonnet that is rotatable about a rotary shaft along a vehicle width direction so as to be located at a closed position for covering these members and at an opened position for exposing these members, the bonnet structure has a following configuration.

The shroud includes a shroud main body provided with an opening that surrounds the cooling fan, and a pair of shroud flanges that respectively extend outward in the vehicle width direction from side surfaces of the shroud main body, each of the shroud flanges having an anteroposterior contact surface that is directed to a first direction, which is opposite to the rotary shaft in the vehicle longitudinal direction. The bonnet is provided with a bonnet flange that extends inward from an inner peripheral surface of the bonnet, and a first elastic sealing member that is attached to the bonnet flange. The bonnet flange is provided to the bonnet so as to be positioned farther toward the first direction than the pair of shroud flanges when the bonnet is located at the closed position. The first elastic sealing member is brought from the first direction into contact with the anteroposterior contact surface when the bonnet is rotated about the rotary shaft from the opened position to the closed position.

The bonnet structure according to the present invention makes it possible to effectively prevent the first elastic sealing member from being in friction during the opening and closing motion of the bonnet while sealing a gap between the shroud and the bonnet by the first elastic sealing member. Therefore, abrasion of the first elastic sealing member can be effectively prevented, and unfavorable detachment of the first elastic sealing member from the bonnet can be effectively prevented while the bonnet is being opened and closed.

In a preferable configuration, each of the pair of shroud flanges is inclined so as to be positioned farther toward the first direction as it extends downward, and the bonnet flange is inclined correspondingly to the shroud flange.

The configuration makes it possible to achieve more stable contact between the first elastic sealing member and the shroud flanges when the bonnet is located at the closed position, so that the sealing property of the first elastic sealing member can be improved.

In a preferable configuration, the bonnet flange is overlapped with the pair of shroud flanges in a front view as viewed along the vehicle longitudinal direction when the bonnet is located at the closed position. The first elastic sealing member may include an attachment portion that has a U-letter shape in cross section and elastically sandwiches the bonnet flange, and a contact portion that extends from the attachment portion toward the shroud flanges so as to be brought into contact with the anteroposterior contact surfaces when the bonnet is located at the closed position. The contact portion is elastically deformable with respect to a direction in which the contact portion extends from the attachment portion.

The configuration makes it also possible to achieve more stable contact between the first elastic sealing member and the shroud flanges when the bonnet is located at the closed position, so that the sealing property of the first elastic sealing member can be improved.

In a preferable configuration, the shroud has a pair of right and left reinforcing flanges that extend in the first direction from the respective side surfaces of the shroud main body, and first direction reinforcing ribs that couple the shroud flanges to the corresponding reinforcing flanges. Each of the first direction reinforcing ribs has an end in the first direction that is formed into such a tapered shape as to be positioned farther inward in the vehicle width direction as it extends toward the first direction.

The configuration makes it possible to increase strength of the shroud flanges, and also utilize as a guide for the first elastic sealing member the first direction reinforcing ribs for reinforcing the shroud flanges.

In a preferable configuration, the shroud may be provided with an upper flange that extends from an upper end of one of the pair of shroud flanges to an upper end of the other one of the pair of shroud flanges so as to pass over an upper end of the shroud main body, the upper flange having an upper contact surface that faces upward. The bonnet may be provided with a second elastic sealing member on the inner peripheral surface. The second elastic sealing member is brought from above into direct or indirect contact with the upper contact surface when the bonnet is rotated around the rotary shaft from the opened position to the closed position.

The configuration makes it possible to prevent the second elastic sealing member from being in friction during the opening and closing motion of the bonnet and also seal a gap between the upper portion of the shroud and the bonnet by the second elastic sealing member when the bonnet is located at the closed position.

In a more preferable configuration, the upper contact surface may include a concave portion that is positioned on one side in the vehicle width direction and is opened upward, the concave portion allowing the intake pipe to extend in the vehicle longitudinal direction across the shroud. In the configuration, the second elastic sealing member is brought from above into contact with the intake portion with respect to a portion of the upper contact surface at which the concave portion is formed.

The configuration makes it possible to easily perform installation and maintenance of the intake pipe with keeping the engine mounted on the vehicle main body only by locating the bonnet at the opened position. Further, the elastic sealing member presses the intake pipe to the concave portion when the bonnet is located at the closed position. Accordingly, it is possible to stabilize support of the intake pipe when the bonnet is located at the closed position.

In a more preferable configuration, the upper contact surface and the anteroposterior contact surfaces are overlapped with each other in the vertical direction.

The configuration makes it possible to seal the gap between the shroud and the bonnet without fault.

In any one of the above various configurations, the rotary shaft is, for example, disposed farther rearward than the engine so that the first direction is set to the forward direction, and the radiator is supported by a support plate extending substantially horizontally. In the configuration, the bonnet flange may have a pair of shroud corresponding regions that correspond to the pair of the shroud flanges, and a support plate corresponding region that faces the support plate when the bonnet is located at the closed position. The first elastic sealing member may have a pair of shroud contact regions and a support plate contact region. The pair of shroud contact regions are attached to the pair of shroud corresponding regions, respectively, and brought into contact with the anteroposterior contact surfaces when the bonnet is located at the closed position. The support plate contact region is attached to the support plate corresponding region and brought from above into contact with an upper surface of the support plate when the bonnet is rotated from the opened position to the closed position.

The configuration makes it possible to enhance sealing property between the bonnet and the support plate, thereby effectively preventing undesired substances such as straw from being sucked through the gap between the bonnet and the support plate. The configuration makes it also possible to prevent the air, which has been exhausted outside from the outlet port of the engine through the exhaust pipe, from entering through the gap between the bonnet and the support plate, thereby effectively preventing reduction in cooling efficiency by the radiator and the cooling fan.

The present application also includes an invention relating to a bonnet structure that is applied to a working vehicle including a radiator, a cooling fan, and an engine, which are disposed in order from the front to the rear of the vehicle, a shroud that surrounds the cooling fan, an air cleaner that is disposed in front of the shroud, an intake pipe that has a first end connected to the air cleaner and a second end connected to an inlet port of the engine, an exhaust silencer that has a first end connected to an outlet port of the engine, and a bonnet that is rotatable about a rotary shaft along a vehicle width direction so as to be located at a closed position for covering these members and at an opened position for exposing these members.

In the bonnet structure described in Patent Document 1, the bonnet, which is rotatable about the rotary shaft along the vehicle width direction, covers in an openable and closable manner an exhaust silencer that has a first end connected to the outlet port of the engine, in addition to the radiator, the cooling fan, and the engine, which are disposed in order from the front to the rear of the vehicle, the shroud that surrounds the cooling fan, the air cleaner that is disposed in front of the shroud, and the intake pipe that has the first end connected to the air cleaner and the second end connected to the inlet port of the engine.

However, the conventional bonnet structure described in Patent Document 1 has possibility for improvement on the following points.

More specifically, in the conventional bonnet structure, the intake pipe passes to a side of the shroud so as to extend in the vehicle longitudinal direction. Accordingly, an engine unit that includes the intake pipe and the exhaust silencer as well as the bonnet that covers the engine unit are disadvantageously increased in size in the vehicle width direction.

Further, in the above conventional bonnet structure, the bonnet has an upper surface that is curved so as to be highest at a center in the vehicle width direction. Accordingly, the field of front vision is also problematic from a driver's seat that is disposed behind the bonnet.

The present application includes a bonnet structure capable of solving the problem of the conventional art.

That is, the present application includes a bonnet structure applicable to a working vehicle including a radiator, a cooling fan and an engine, which are disposed in order from a front to a rear of the vehicle, a shroud that surrounds the cooling fan, an air cleaner that is disposed in front of the shroud, an intake pipe that has a first end connected to the air cleaner and a second end connected to an inlet port of the engine, an exhaust silencer that has a first end connected to an outlet port of the engine, and a bonnet that is rotatable about a rotary shaft along a vehicle width direction so as to be located at a closed position for covering these members and at an opened position for exposing these members, wherein the bonnet structure is capable of improving the driver's field of front vision while reducing size with respect to the vehicle width direction of an engine unit that includes the intake pipe and the exhaust silencer as well as of the bonnet that covers the engine unit.

More specifically, the present application provides a bonnet structure applicable to a working vehicle including a radiator, a cooling fan and an engine, which are disposed in order from a front to a rear of the vehicle, a shroud that surrounds the cooling fan, an air cleaner that is disposed in front of the shroud, an intake pipe that has a first end connected to the air cleaner and a second end connected to an inlet port of the engine, an exhaust silencer that has a first end connected to an outlet port of the engine, and a bonnet that is rotatable about a rotary shaft along a vehicle width direction so as to be located at a closed position for covering these members and at an opened position for exposing these members, wherein the intake pipe and the exhaust silencer are disposed above the engine and are separately from each other so as to be on first and second sides in the vehicle width direction, respectively, wherein the intake pipe extends in a vehicle longitudinal direction above and across the shroud, and wherein an upper surface of the bonnet includes a first region in the vehicle width direction and a second region in the vehicle width direction that faces the intake pipe and the exhaust silencer, respectively, and a central region in the vehicle width direction, the first and second regions extending along a reference curve shape having a center in the vehicle width direction that is located at a highest position, the central region being concaved downward from the reference curve shape.

The thus configured bonnet structure makes it possible to reduce in size in the vehicle width direction of the bonnet in comparison to a conventional configuration in which an intake pipe passes to a side of a shroud, since the intake pipe and the exhaust silencer are disposed above the engine and are separately to each other so as to be on the first and second sides in the vehicle width direction, respectively, and, in addition, the intake pipe is located above the shroud.

Further, in the bonnet structure according to the present invention, out of the upper surface of the bonnet, the first region and the second region in the vehicle width direction that face the intake pipe and the exhaust silencer, respectively, extend along the reference curve shape having the center located at the highest position in the vehicle width direction, and the central region in the vehicle width direction out of the upper surface of the bonnet is concaved downward from the reference curve shape. Accordingly, the height of the central region in the vehicle width direction of the bonnet can be set as low as possible despite the fact that the intake pipe and the exhaust silencer are disposed above the engine.

Therefore, the size in the vehicle width direction can be reduced of an engine unit that includes the intake pipe and the exhaust silencer as well as of the bonnet that covers the engine unit, while the driver's field of front vision being improved.

In a preferable configuration, the bonnet is provided with an elastic sealing member on a portion of its inner peripheral surface that faces the shroud. An upper surface of the shroud is configured so that a region on the first side in the vehicle width direction forms a concave portion that is concaved downward from the remaining region. The concave portion is defined by a vertical surface and a horizontal surface. The vertical surface extends downward from a first end in the vehicle width direction of a center region in the vehicle width direction, and the horizontal surface extends from a lower end of the vertical surface toward the first side in the vehicle width direction. The intake pipe passes through the concave portion formed at the upper surface of the shroud so as to extend in the vehicle longitudinal direction across the shroud. A portion of the intake pipe that is located in the concave portion has an upper surface that is inclined so as to be positioned downward as it extends toward outward in the vehicle width direction.

The configuration makes it possible to facilitate connecting word and detaching work of the intake pipe and the air cleaner with keeping the engine mounted on the vehicle main body only by locating the bonnet at the opened position. Further, the elastic sealing member presses the intake pipe to the vertical surface and the horizontal surface when the bonnet is located at the closed position. Accordingly, it is possible to stabilize support of the intake pipe when the bonnet is located at the closed position.

BRIEF DESCRIPTION OF THE DRAWINGS

FIG. 8 is a perspective view of the bonnet in a state where one of side plates of the bonnet is removed.

FIG. 9 is a horizontally cross-sectional perspective view of the bonnet.

FIGS. 17A to 17D are schematic views of the first elastic sealing members.

EMBODIMENT FOR CARRYING OUT THE INVENTION

Described below is a bonnet structure according to a preferred embodiment of the present invention with reference to the accompanying drawings.

Figure 1:
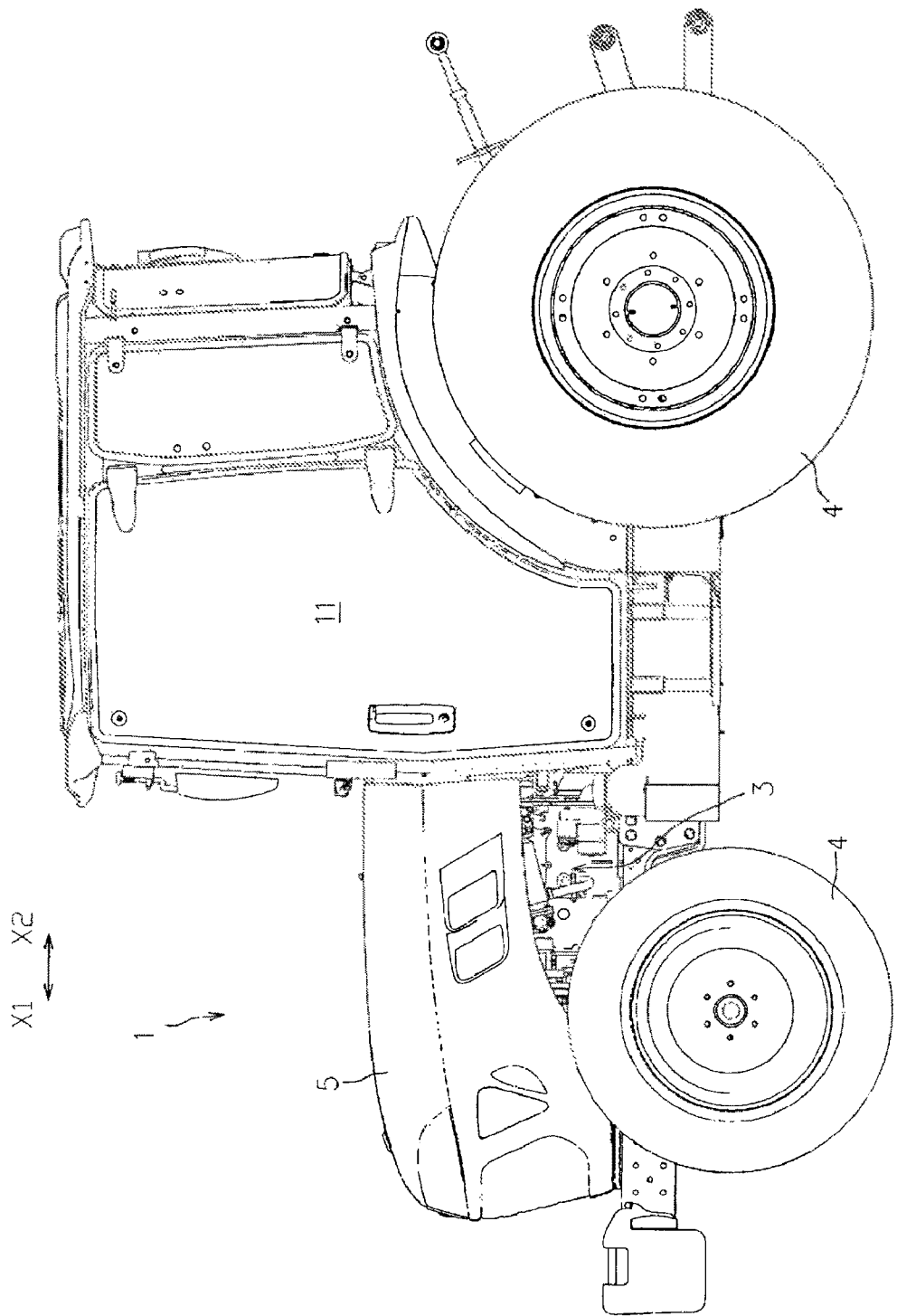
FIG. 1 is a left side view of a working vehicle to which a bonnet structure according to one embodiment of the present invention is applied.

FIG. 1 is a left side view of a working vehicle 1 to which a bonnet structure according to an embodiment of the present invention is applied.

As shown in FIG. 1, the working vehicle 1 is configured as a tractor to which a working device is mountable.

As shown in FIG. 1, the working vehicle 1 includes a vehicle frame 2, an engine 3 that is supported by the vehicle frame 2, a pair of right and left travel units 4 that are driven by the engine 3, and a bonnet 5 that surrounds the engine 3.

Figure 2:
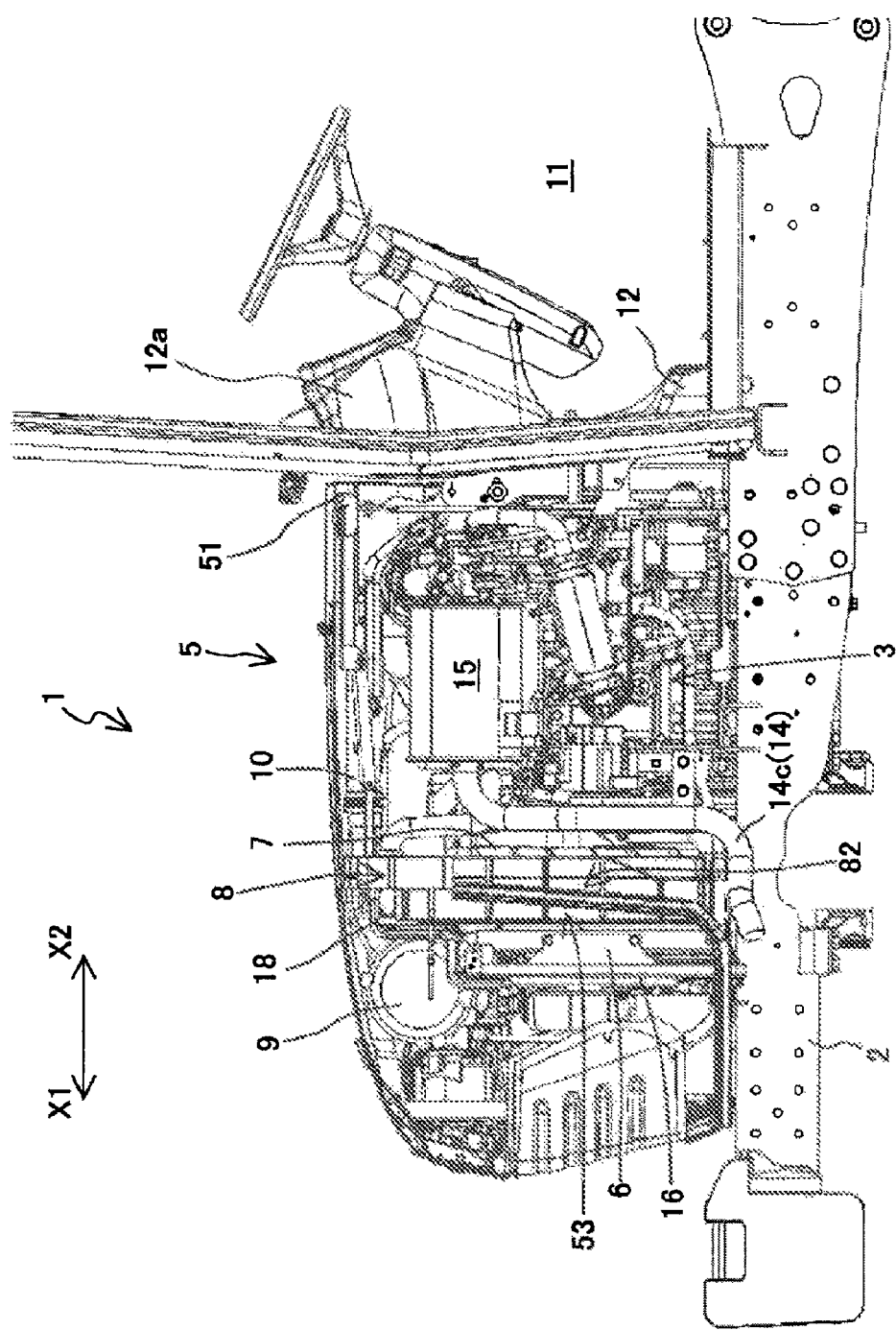
FIG. 2 is a left side view showing an inner portion of a bonnet in the working vehicle shown in FIG. 1.
Figure 3:
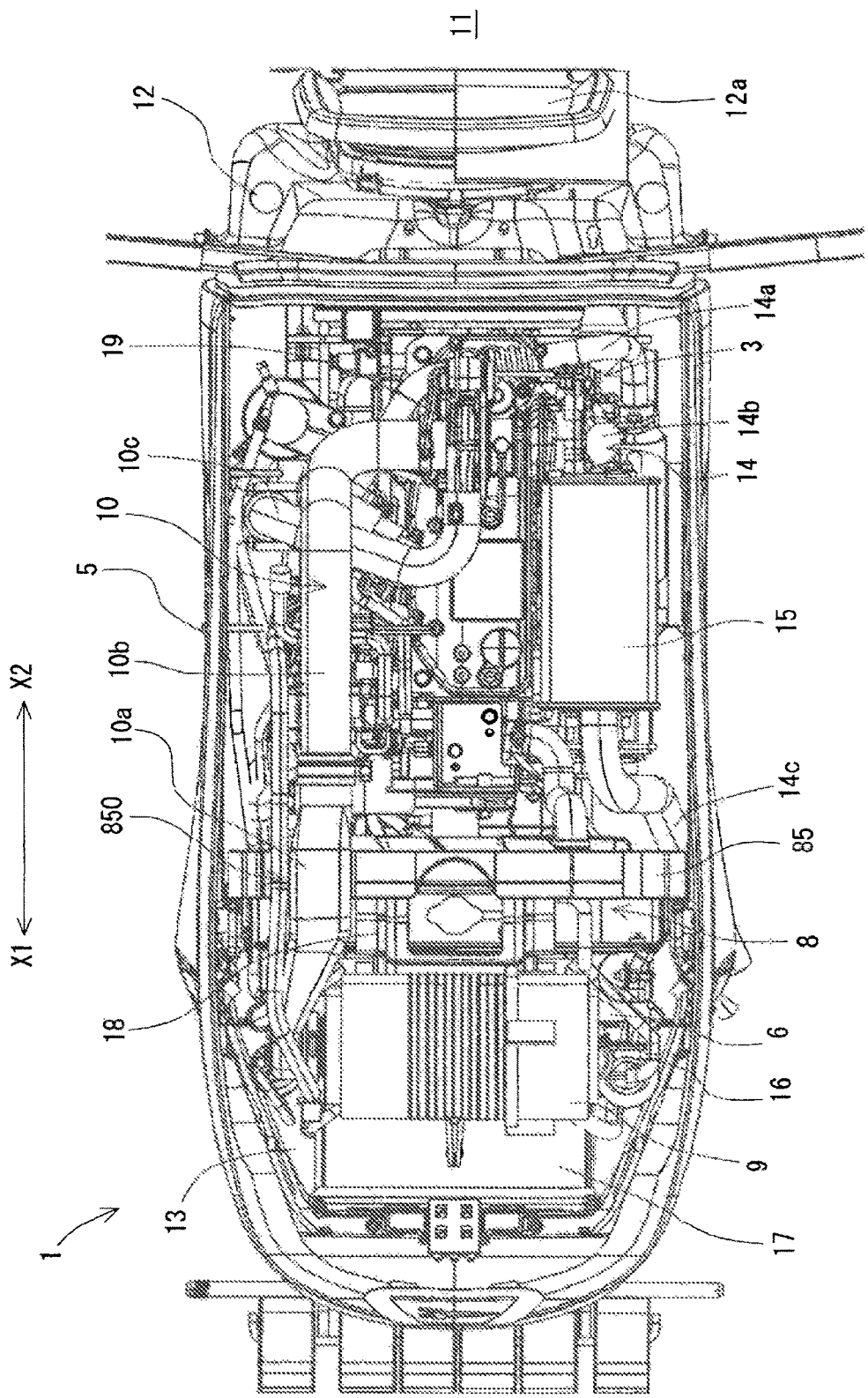
FIG. 3 is a plan view showing the inner portion of the bonnet.
Figure 4:
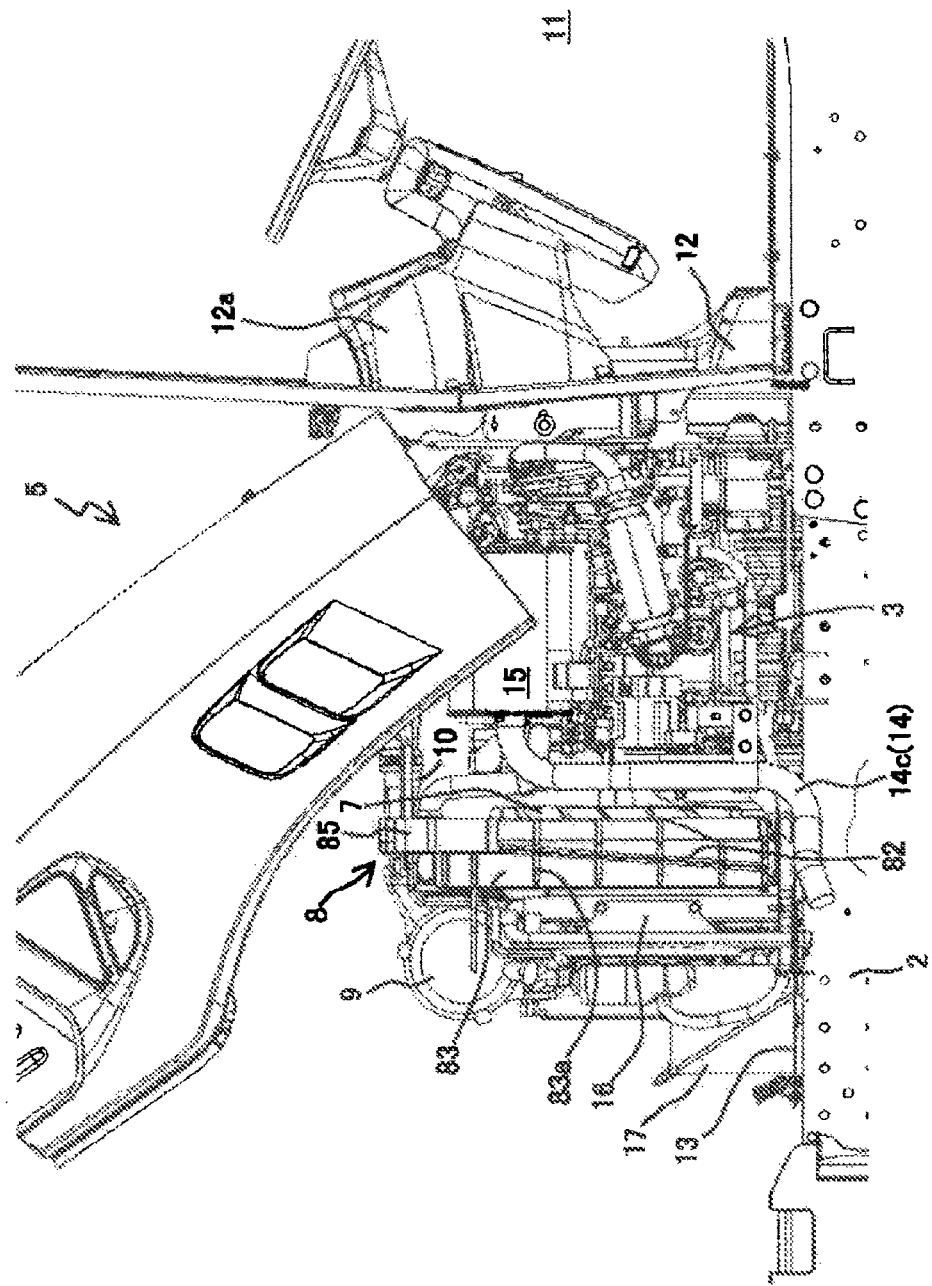
FIG. 4 is a left side view of the working vehicle in a state where the bonnet is located at an opened position.

FIGS. 2 and 3 are a left side view and a plan view each showing an inner portion of the bonnet 5 in the working vehicle 1. FIG. 4 is a left side view in a state where the bonnet 5 in the working vehicle 1 is located at an opened position.

As shown in FIGS. 2 to 4, in the bonnet 5, there are provided in front of the engine 3 a radiator 6 and a cooling fan 7 that are disposed in order from the front to the rear of the vehicle.

In the present embodiment, the cooling fan 7 is driven about a rotation axis 71 along a vehicle longitudinal direction.

The working vehicle 1 includes a shroud 8 that surrounds the cooling fan 7.

The working vehicle 1 further includes an air cleaner 9 that is disposed in front of the shroud 8, an intake pipe 10 that has a first end connected to the air cleaner 9 and a second end connected to an inlet port of the engine 3, and an exhaust silencer 15 that has a first end connected to an outlet port of the engine 3.

As shown in FIGS. 1 to 4, there is provided behind the engine 3 a driver's seat installation space 11 in which a driver's seat (not shown) is disposed. The driver's seat installation space 11 and the engine 3 are separated from each other by an air separator plate 12. Provided on a side on which the driver's seat installation space 11 is arranged with the air separator plate 12 as a reference is a dashboard 12a on which operation members and an instrument panel (not shown) are mounted.

The bonnet 5 is disposed in front of the air separator plate 12.

The bonnet 5 is supported at an upper and rear end thereof so as to be rotatable about a rotary shaft 51 (see FIGS. 1 and 4) along the vehicle width direction.

More specifically, the bonnet 5 is rotatable about the rotary shaft 51 so as to be located at the closed position (see FIG. 2) for surrounding the radiator 6, the air cleaner 9, the shroud 8, the cooling fan 7, and the engine 3 (see FIG. 1) and at the opened position (see FIG. 4) for exposing these members.

Figure 5:
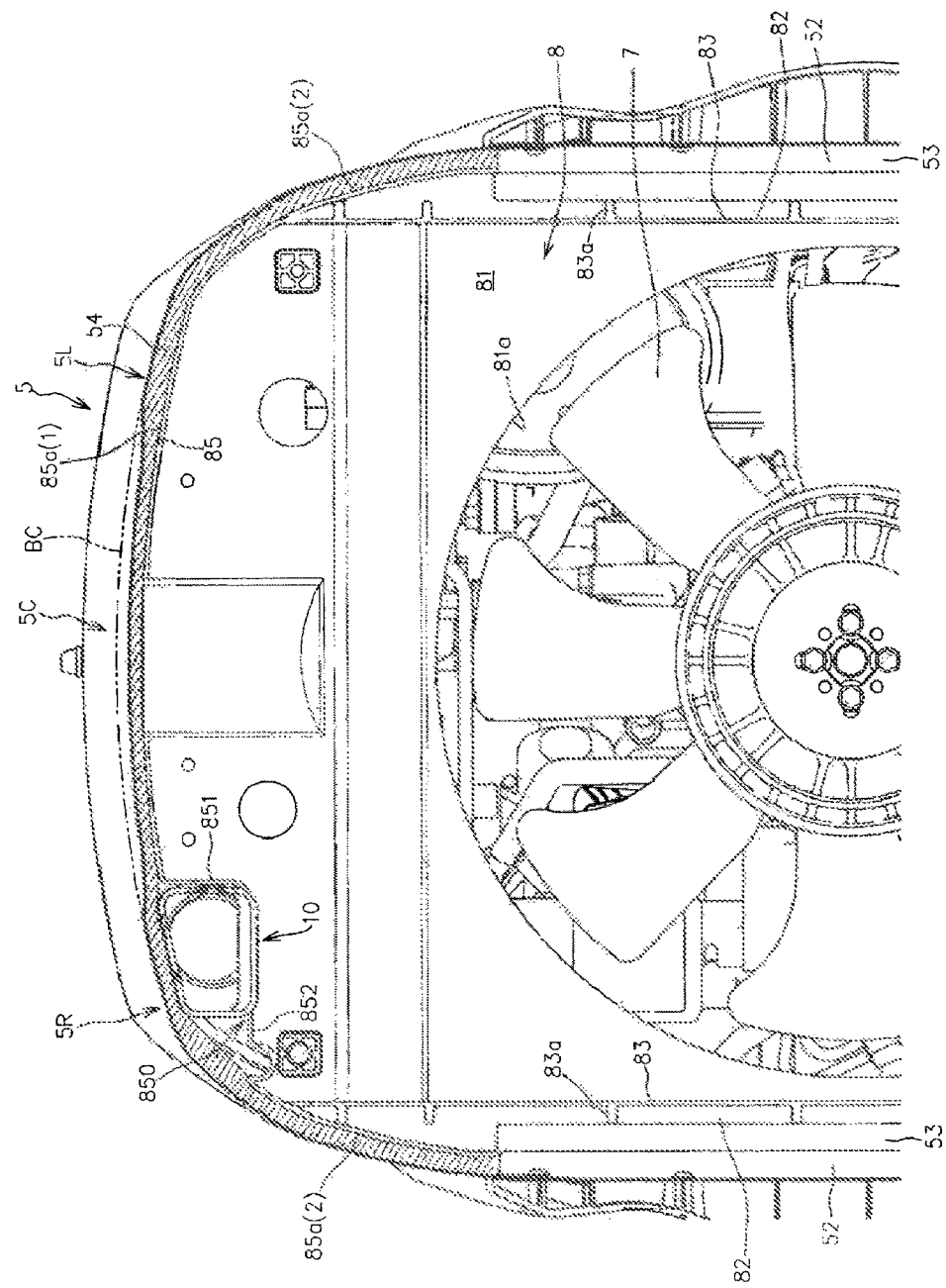
FIG. 5 is a cross-sectional view of the bonnet taken vertically at a position in front of a shroud.

FIG. 5 is a cross-sectional view of the bonnet 5 taken vertically at a position in front of the shroud 8.

As shown in FIGS. 3 and 5, in the present embodiment, the intake pipe 10 and the exhaust silencer 15 are disposed above the engine 3 and are separately from each other so as to be on first and second sides in the vehicle width direction, respectively.

More specifically, as shown in FIGS. 3 and 5, the intake pipe 10 passes above the shroud 8 so as to extend over the shroud 8 in the vehicle longitudinal direction. In other words, the intake pipe 10 extends above the shroud 8 in the vehicle longitudinal direction so as to have first and second ends that are located on a first side X1 and on a second side X2 in the vehicle longitudinal direction with the shroud 8 as a reference.

As shown in FIG. 5, the upper surface of the bonnet 5 includes a first region 5R in the vehicle width direction and a second region 5L in the vehicle width direction which face the intake pipe 10 and the exhaust silencer 15 respectively and extend along a reference curve shape BC having a center located at a highest position in the vehicle width direction. The upper surface of the bonnet 5 also includes a central region 5C in the vehicle width direction which is concaved downward from the reference curve shape BC.

In the bonnet structure configured as described above, the intake pipe 10 and the exhaust silencer 15 are disposed above the engine 3 and are separately to each other so as to be on the first and second sides in the vehicle width direction. In addition, the intake pipe 10 is located above the shroud 8. Therefore, in the above bonnet structure, the bonnet 5 can be reduced in size in the vehicle width direction in comparison to a conventional configuration in which an intake pipe passes to a side of a shroud.

Further, the upper surface of the bonnet 5 includes the first region 5R and the second region 5L in the vehicle width direction which face the intake pipe 10 and the exhaust silencer 15 respectively and extend along the reference curve shape BC having the center located at the highest position in the vehicle width direction. The upper surface of the bonnet 5 also includes the central region 5C in the vehicle width direction which is concaved downward from the reference curve shape BC. Accordingly, the height of the central region 5C in the vehicle width direction of the bonnet 5 can be set as low as possible despite the fact that the intake pipe 10 and the exhaust silencer 15 are disposed above the engine 3.

Therefore, the size in the vehicle width direction can be reduced of an engine unit that includes the intake pipe 10 and the exhaust silencer 15 as well as of the bonnet 5 that covers the engine unit, while the driver's field of front vision being improved.

In the present embodiment, as shown in FIG. 5, the central region 5C in the vehicle width direction of the bonnet 5 has a curvature substantially same as that of the reference curve shape BC while being displaced below the reference curve shape BC.

This configuration improves the driver's field of front vision as well as the appearance of the bonnet 5.

Further, in the present embodiment, the intake pipe 10 is disposed on the first side in the vehicle width direction (a right side in a forward traveling direction) and the exhaust silencer 15 is disposed on the second side in the vehicle width direction (a left side in the forward traveling direction). Alternatively, the exhaust silencer 15 may be disposed on the first side in the vehicle width direction and the intake pipe 10 may be disposed on the second side in the vehicle width direction. In this case, the shroud 8 is provided with a concave portion 850 on the second side in the vehicle width direction.

As shown in FIG. 5, in the present embodiment, the intake pipe 10 extends across the shroud 8 in the vehicle longitudinal direction in a state of being disposed in the concave portion that is formed in the upper surface of the shroud 8.

More specifically, the upper surface of the shroud 8 is configured so that a region on the first side in the vehicle width direction forms the concave portion 850 that is concaved downward from the remaining portion.

The intake pipe 10 is located in the concave portion 850 and extends across the shroud 8 in the vehicle longitudinal direction.

The configuration makes it possible to achieve the reduction in size of the bonnet 5 in the vehicle width direction since the intake pipe 10 is disposed above the shroud 8. Further, according to the configuration, the intake pipe 10 and the air cleaner 9 can be easily connected with and detached from each other with keeping the engine 3 mounted on the vehicle main body only by locating the bonnet 5 at the opened position.

As shown in FIG. 5, the bonnet 5 is provided with a second elastic sealing member 54 on the inner peripheral surface at a portion facing the upper surface of the shroud 8. The second elastic sealing member 54 fills as much as possible a gap between the upper surface of the shroud 8 and the inner peripheral surface of the bonnet 5 so as to improve the sealing property between the first and second sides in the vehicle longitudinal direction of the shroud 8.

The present embodiment adopts the following configuration in order to allow the intake pipe 10 to be stably supported by the second elastic sealing member 54.

Figure 6:
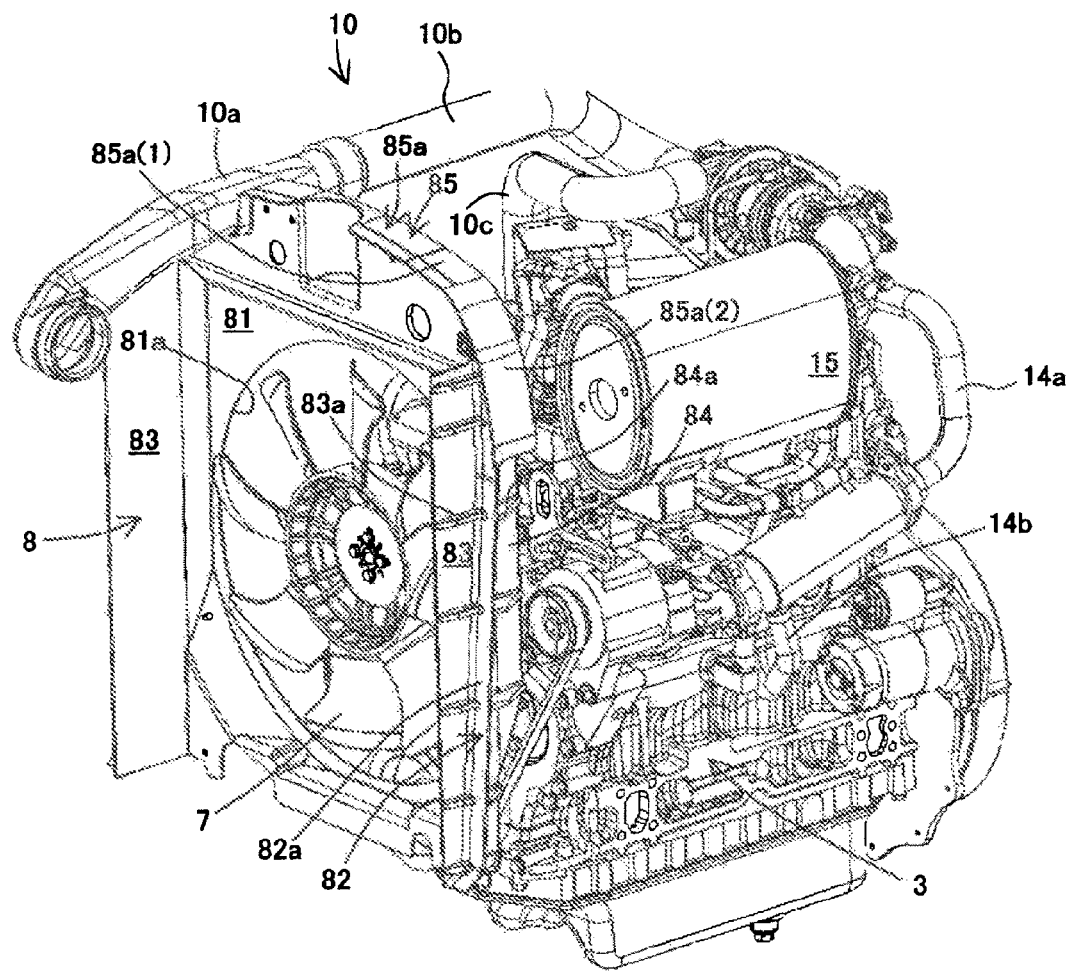
FIG. 6 is a perspective view of an assembly in the working vehicle that includes a cooling fan, the shroud, an intake pipe and an engine.

FIG. 6 is a perspective view of an assembly that includes the cooling fan 7, the shroud 8, the intake pipe 10, the engine 3, and the like.

Figure 7:
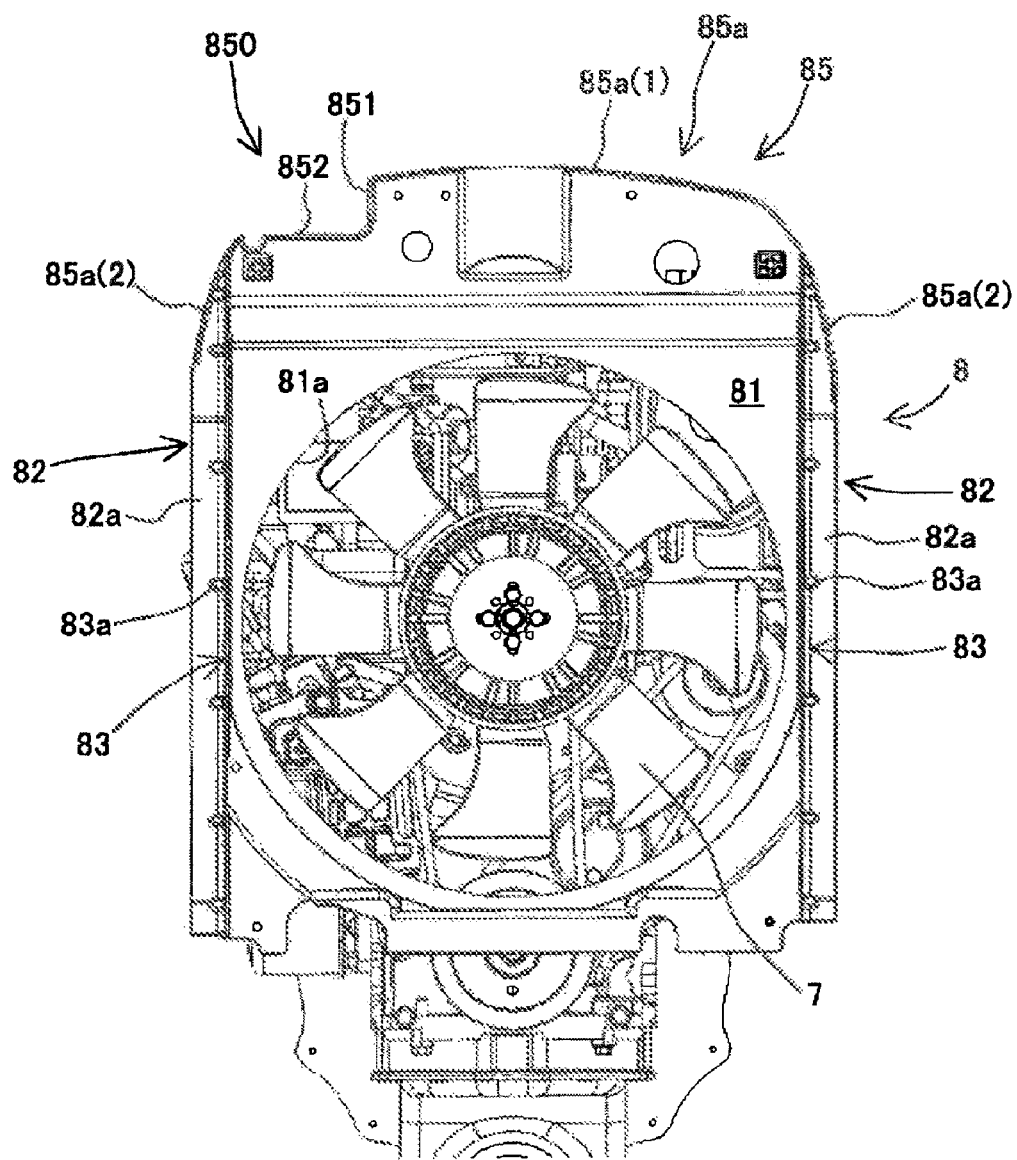
FIG. 7 is a front view of the assembly in a state where the intake pipe is removed therefrom.

FIG. 7 is a front view of the assembly in a state where the intake pipe 10 is removed therefrom.

As described earlier, the intake pipe 10 passes to an upper side of the shroud 8 so as to be across the shroud 8 in the vehicle longitudinal direction while being located in the concave portion 850.

Accordingly, the second elastic sealing member 54 is directly in contact with the upper surface of the shroud 8 in the region except for the concave portion 850, and is indirectly in contact with the upper surface at the concave portion 850 with the intake pipe 10 being interposed therebetween.

As shown in FIGS. 5 to 7, the concave portion 850 is defined by a vertical surface 851 and a horizontal surface 852. The vertical surface 851 extends downward from the first end in the vehicle width direction of the central region 5C in the vehicle width direction of the bonnet 5. The horizontal surface 852 extends from the lower end of the vertical surface 851 toward the first end in the vehicle width direction.

As shown in FIG. 5, a portion of the intake pipe 10 that is located in the concave portion 850 has an upper surface that is inclined so as to be positioned downward as it extends toward outward in the vehicle width direction.

In this configuration, the second elastic sealing member 54 fills the gap between the shroud 8 and the bonnet 5 as much as possible and presses the intake pipe 10 toward the vertical surface 851 and the horizontal surface 852. Therefore, the intake pipe 10 can be stably supported when the bonnet 5 is located at the closed position.

In the present embodiment, the concave portion 850 is provided on the right side in the vehicle width direction with respect to the vehicle forward traveling direction.

As shown in FIG. 5, the intake pipe 10 has the side surface facing the vertical surface 851 and the lower surface facing the horizontal surface 852 at the portion located in the concave portion 850, and these surfaces are shaped so as to correspond to the shape of the concave portion 850 provided in the shroud 8.

According to the above configuration, the bonnet 5 located at the closed position presses the intake pipe 10 so as to bring into tight contact with the concave portion 850 in the shroud 8. Accordingly, the sealing property at the concave portion 850 can be improved and the vibration of the intake pipe 10 can be effectively prevented.

The second elastic sealing member 54 can be made of a urethane material or the like. Alternatively, a sealing member same as a first elastic sealing member 53, which is to be described later, may be attached by way of a flange that is provided to the inner peripheral surface of the bonnet 5.

In the present embodiment, as shown in FIG. 3, a turbocharger 19 is provided above the engine 3 as well as between the intake pipe 10 and the exhaust silencer 15 in the vehicle width direction. The turbocharger 19 increases flow speed of the intake air, which is imported thereinto through the intake pipe 10, using the exhaust air imported thereinto from the outlet port of the engine 3 through an exhaust pipe 14, and then imports the intake air whose flowing speed has been increased into the inlet port of the engine 3.

As shown in FIGS. 3 and 6, in the present embodiment, the intake pipe 10 has a shroud passing portion 10a, an intake air import portion 10b, and an intake air speedup portion 10c. The shroud passing portion 10a has a first end connected to the air cleaner 9 that is located on the first side X1 in the vehicle longitudinal direction with respect to the shroud 8, and a second end passing through the concave portion 850 and extending from the shroud 8 to the second side X2 in the vehicle longitudinal direction. The intake air import portion 10b has a first end connected to the second end of the shroud passing portion 10a and a second end connected to the intake air inlet port of the turbocharger 19. The intake air speedup portion 10c has a first end connected to the intake air outlet port of the turbocharger 19 and a second end connected to the inlet port of the engine 3.

The exhaust pipe 14 has an exhaust air import portion 14a, an exhaust air guide portion 14b, and an exhaust air outlet portion 14c. The exhaust air import portion 14a imports the exhaust air from the outlet port of the engine 3 into the exhaust air inlet port of the turbocharger 19. The exhaust air guide portion 14b has a first end connected to the exhaust air outlet port of the turbocharger 19 and a second end connected to the exhaust silencer 15. The exhaust air outlet portion 14c has a first end connected to the exhaust silencer 15 and a second end located below and outside the bonnet 5 (more specifically, below and outside a support plate 13, which is to be described later).

The configuration of the shroud 8 is described in detail below.

As shown in FIGS. 5 to 7, the shroud 8 has a shroud main body 81, a pair of right and left shroud flanges 82, and an upper flange 85. The shroud main body 81 is provided with an opening 81a that surrounds the cooling fan 7. The pair of shroud flanges 82 respectively extend outward in the vehicle width direction from the side surfaces of the shroud main body 81. The upper flange 85 extends from the upper end of one of the pair of shroud flanges 82 to the upper end of the other one of the pair of shroud flanges 82 so as to pass over the upper end of the shroud main body 81.

The upper flange 85 has an upper contact surface 85a that is directed upward so as to form the upper surface of the shroud 8.

The upper contact surface 85a has a central region 85a(1) corresponding to the shroud main body 81, and a pair of side regions 85a(2) located on both sides of the central region 85a(1).

The pair of side regions 85a(2) are each configured to be positioned downward and to be spaced apart from the corresponding side surface of the shroud main body 81 as it extends outward in the vehicle width direction.

As shown in FIGS. 6 and 7, each of the shroud flanges 82 has an anteroposterior contact surface 82a that is directed to the first side X1 in the vehicle longitudinal direction (in a first direction), which is in the direction opposite to the rotary shaft 51 (see FIG. 2) in the vehicle longitudinal direction.

When the bonnet 5 is located at the closed position, the anteroposterior contact surface 82a is brought into contact with the first elastic sealing member 53 that is provided onto the inner peripheral surface of the bonnet 5.

FIG. 8 is a perspective view of the bonnet 5 in a state where one of the side plates of the bonnet 5 is removed.

Figure 10:
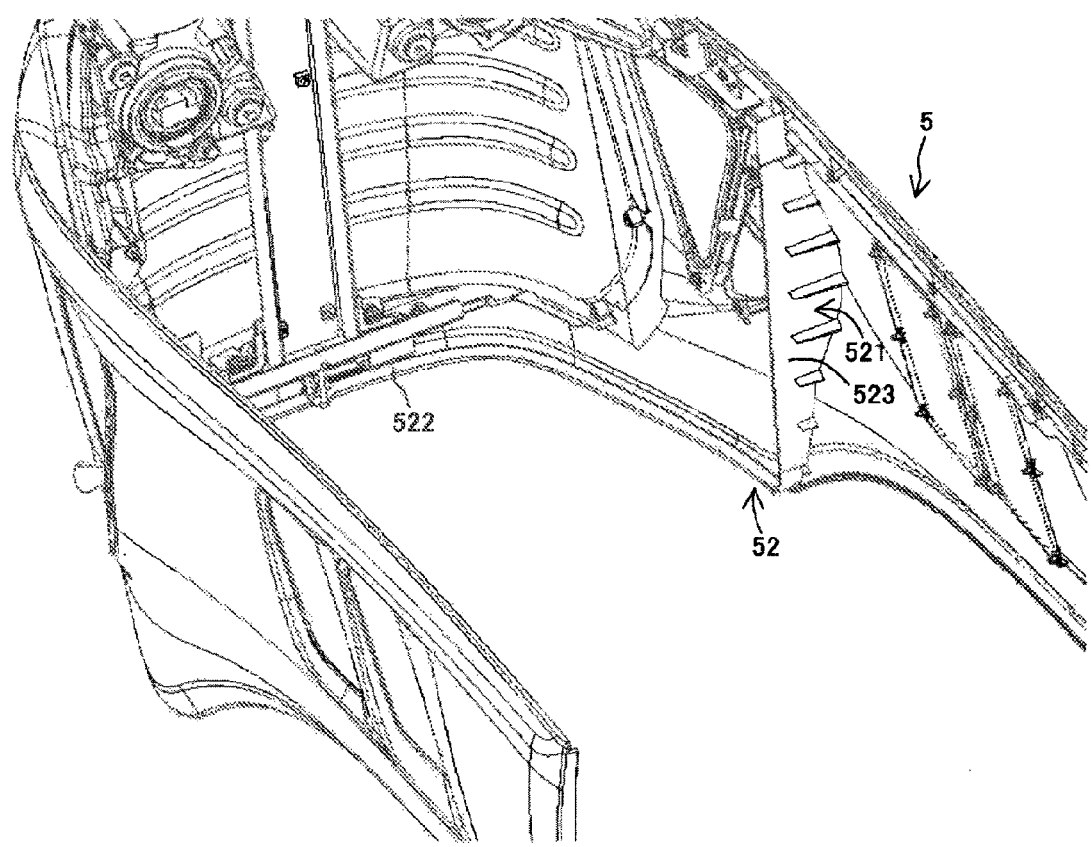
FIG. 10 is a perspective view showing a state where a first elastic sealing member is removed from the state shown in FIG. 9.

FIG. 9 is a horizontally cross-sectional perspective view of the bonnet 5. FIG. 10 is a perspective view showing a state where the first elastic sealing member 53 is removed from the state shown in FIG. 9.

As shown in FIGS. 8 to 10, the bonnet 5 is provided with a bonnet flange 52 that extends inward from the inner peripheral surface of the bonnet 5. The first elastic sealing member 53 is attached to the bonnet flange 52.

Figure 11:
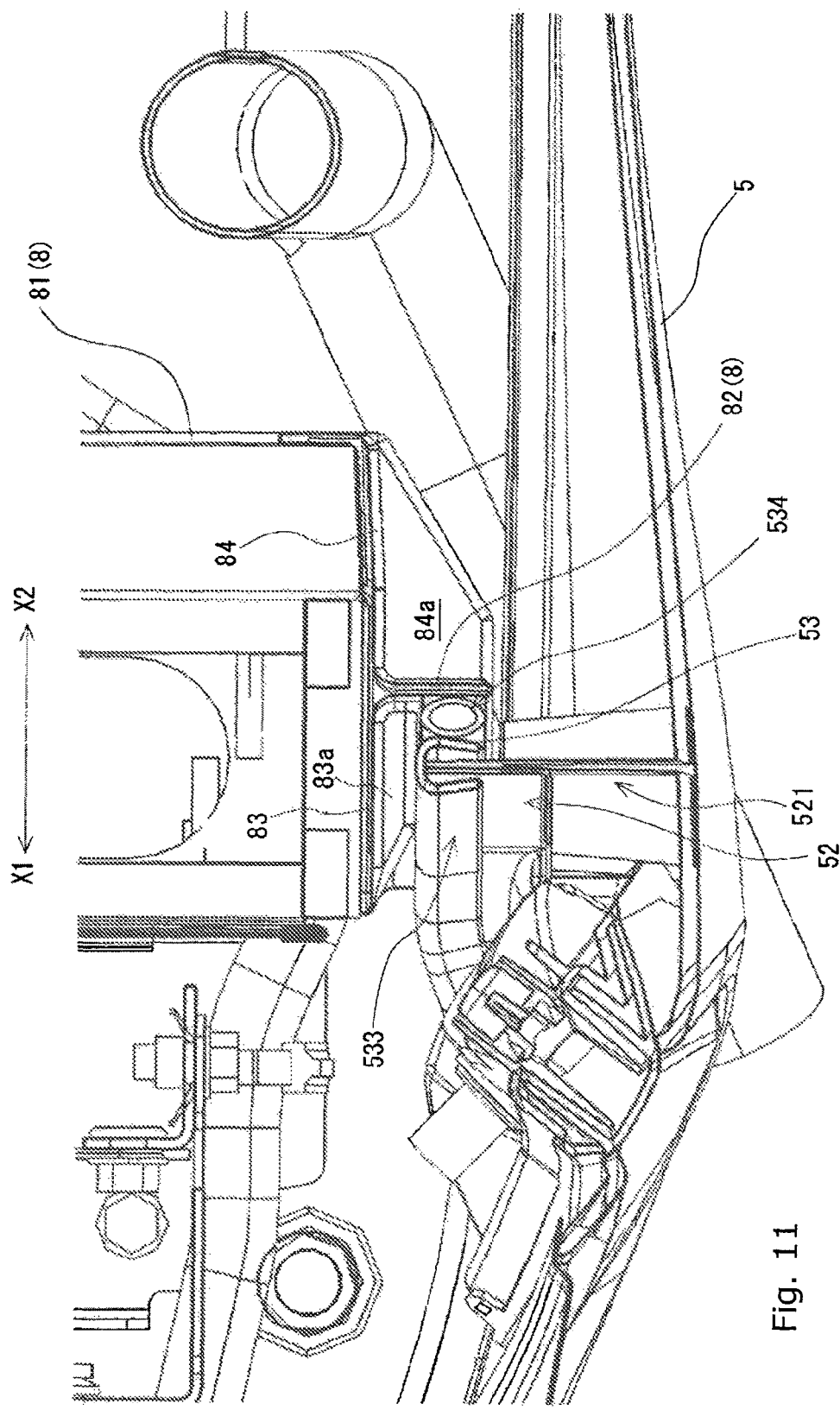
FIG. 11 is an enlarged horizontally cross-sectional view of a shroud flange and a bonnet flange as well as the vicinity thereof in the state where the bonnet is located at the closed position.

FIG. 11 is an enlarged horizontally cross-sectional view of the shroud flange 82 and the bonnet flange 52 as well as the vicinity thereof in the state where the bonnet 5 is located at the closed position.

As shown in FIG. 11, the bonnet flange 52 is provided to the bonnet 5 so as to be located on the first side X1 in the vehicle longitudinal direction (in the first direction) with respect to the shroud flange 82 when the bonnet 5 is located at the closed position. Accordingly, the first elastic sealing member 53 attached to the bonnet flange 52 is brought into contact with the anteroposterior contact surface 82a from the first direction when the bonnet 5 is rotated about the rotary shaft 51 from the opened position to the closed position.

More specifically, in the present embodiment, when the bonnet 5 is rotated from the opened position to the closed position, the first elastic sealing member 53 is brought into tight contact with the shroud flange 82 from the first side X1 in the vehicle longitudinal direction (the side in the first direction) in a state of being elastically deformed.

The configuration described above makes it possible to effectively prevent the first elastic sealing member 53 from being in friction during the opening and closing motion of the bonnet 5 while sealing the gap between the shroud 8 and the side portions of the bonnet 5 by the first elastic sealing member 53. Therefore, abrasion of the first elastic sealing member 53 can be effectively prevented, and unfavorable detachment of the first elastic sealing member 53 from the bonnet 5 can be effectively prevented while the bonnet 5 is being opened and closed.

In the present embodiment, the first elastic sealing member 53 is a so-called weather-strip made of an elastic resin material such as rubber or sponge and formed in the shape of a string, which is detailed later.

As shown in FIG. 2, in the present embodiment, the rotary shaft 51 is disposed behind the engine 3. Accordingly, in the present embodiment, the first direction corresponds to the forward direction of the vehicle.

In the present embodiment, the first elastic sealing member 53 also seals the gap between the bonnet 5 and the support plate 13 that supports the radiator 6.

More specifically, as shown in FIGS. 3 and 4, the working vehicle 1 includes the support plate 13 that is disposed substantially in the horizontal direction so as to allow the radiator 6 to be mounted thereon and is substantially covered with the bonnet 5 when the bonnet 5 is located at the closed position.

In the present embodiment, the shroud 8 is also supported by the support plate 13.

Further, as shown in FIG. 10, the bonnet flange 52 has a pair of shroud corresponding regions 521 and a support plate corresponding region 522. The pair of shroud corresponding regions 521 are provided so as to correspond to the pair of shroud flanges 82, respectively. The support plate corresponding region 522 faces the support plate 13 when the bonnet 5 is located at the closed position.

As shown in FIGS. 8 and 9, the first elastic sealing member 53 has a pair of shroud contact regions 531 and a support plate contact region 532. The pair of shroud contact regions 531 are attached to the pair of shroud corresponding regions 521 and are respectively brought into contact with the anteroposterior contact surfaces 82a when the bonnet 5 is located at the closed position. The support plate contact region 532 is attached to the support plate corresponding region 522 and is brought from above into contact with the upper surface of the support plate 13 when the bonnet 5 is rotated from the opened position to the closed position.

In the above configuration, the gap between the bonnet 5 and the support plate 13 can be sealed by the first elastic sealing member 53, which also seals the gap between the bonnet 5 and the side portions of the shroud 8. It is therefore possible to effectively prevent undesired substances such as straw from being sucked through the gap between the bonnet 5 and the support plate 13.

Further, the air exhausted outside from the outlet port of the engine 3 through the exhaust pipe 14 can be prevented from entering through the gap between the bonnet 5 and the support plate 13. As a result, effectively prevented is the reduction in cooling efficiency by the radiator 6 and the cooling fan 7.

Figure 12:
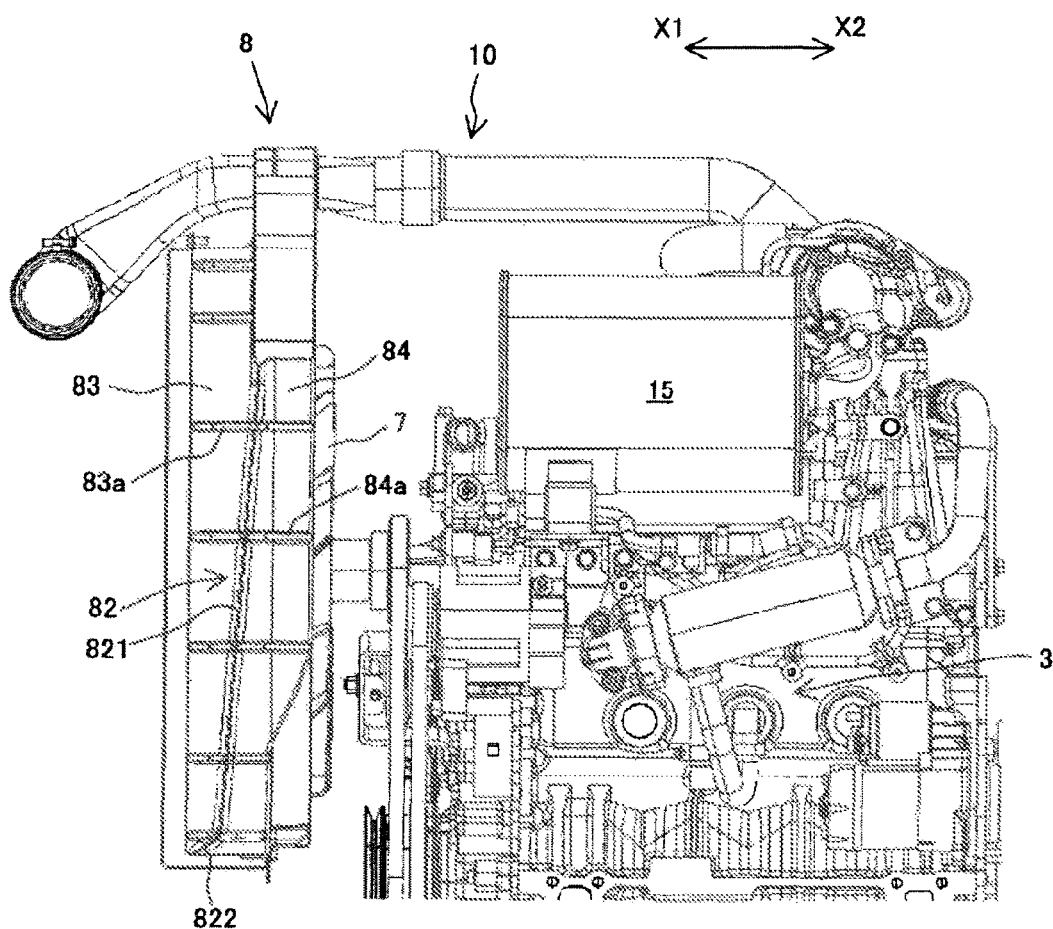
FIG. 12 is a side view of the assembly shown in FIG. 6.

FIG. 12 is a side view of the assembly shown in FIG. 6.

As shown in FIGS. 4, 6, and 12, each of the shroud flanges 82 is preferably inclined so as to be positioned farther toward the first direction (the forward direction in the present embodiment) as extending from its upper end to the lower end, and the bonnet flange 52 is inclined so as to correspond to the shroud flanges 82.

The configuration described above achieves more stable contact between the first elastic sealing member 53 and the shroud flanges 82 when the bonnet 5 is located at the closed position, so that the sealing property of the first elastic sealing member 53 can be improved.

In the present embodiment, as described earlier, the bonnet flange 52 has the shroud corresponding regions 521 and the support plate corresponding region 522. Accordingly, the shroud corresponding regions 521 are inclined so as to correspond to the shroud flanges 82, respectively.

In a preferable configuration, as shown in FIGS. 4, 6, and 12, each of the shroud flanges 82 has a main body region 821 and a lower end region 822, and the lower end region 822 is inclined at an angle larger than that of the inclination of the main body region 821. In other words, the lower end region 822 can be provided to be more along the horizontal direction rather than the main body region 821.

This configuration can prevent a large load from being applied to each of the boundaries between the shroud contact regions 531 and the support plate contact region 532.

As shown in FIGS. 5 to 7 and 12, in the present embodiment, the shroud 8 has a pair of right and left reinforcing flanges 83 and first direction reinforcing ribs 83a. The pair of reinforcing flanges 83 extend in the first direction (in the vehicle forward direction in the present embodiment) from the respective side surfaces of the shroud main body 81. The first direction reinforcing ribs 83a couple the shroud flanges 82 to the corresponding reinforcing flanges 83.

Figure 13:
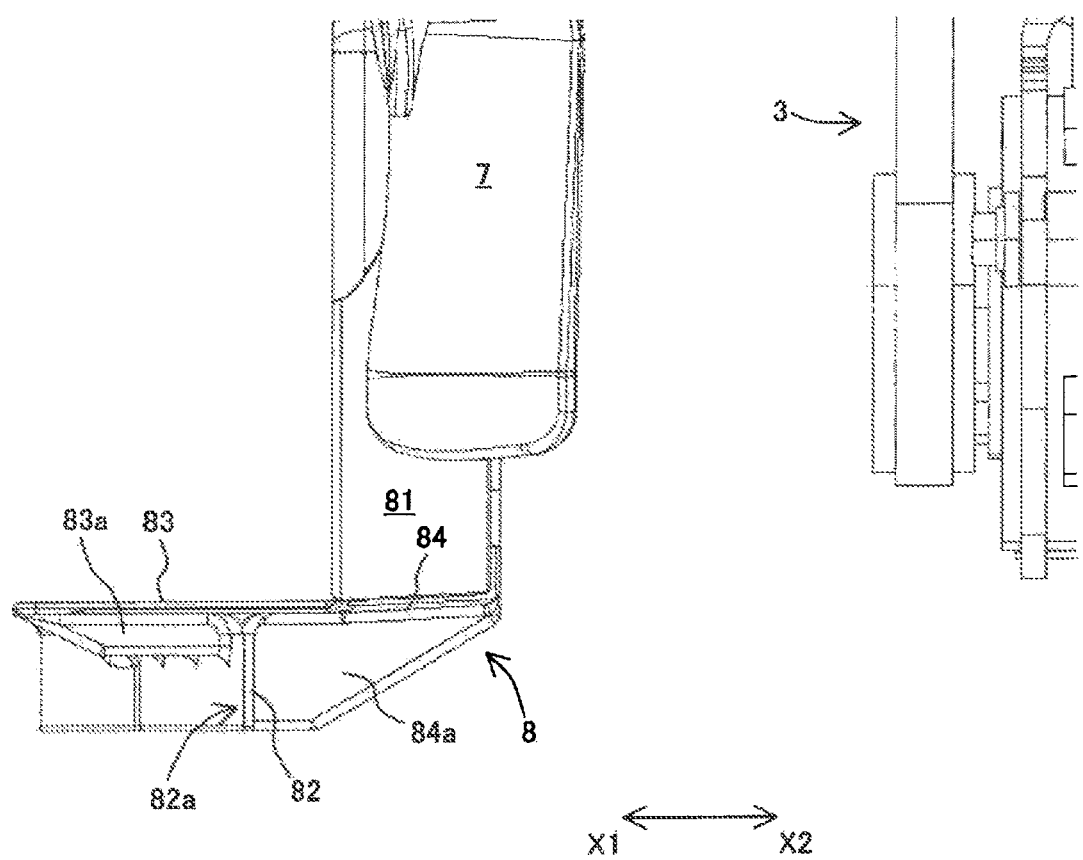
FIG. 13 is a laterally cross-sectional partial plan view of the shroud.

FIG. 13 is a laterally cross-sectional partial plan view of the shroud 8.

As shown in FIG. 13, each of the first direction reinforcing ribs 83a has an end in the first direction that is formed into such a tapered shape as to be brought closer to the corresponding side surface of the shroud main body 81 (in other words, located farther inward in the vehicle width direction) as it extends toward the first direction.

In the above configuration, each of the first direction reinforcing ribs 83a provided for reinforcing corresponding one of the pair of shroud flanges 82 can serve as a guide for the first elastic sealing member 53 when the bonnet 5 is rotated from the opened position to the closed position.

As shown in FIGS. 6, 11, 12, and 13, in the present embodiment, the shroud 8 has a pair of right and left second reinforcing flanges 84 and second direction reinforcing ribs 84a. The pair of second reinforcing flanges 84 extend to the second side X2 in the vehicle longitudinal direction which is in the direction opposite to the first direction (hereinafter, referred to as a second direction where appropriate, which is the vehicle rearward direction in the present embodiment) from the respective side surfaces of the shroud main body 81. The second direction reinforcing ribs 84a couple the shroud flanges 82 to the corresponding second reinforcing flanges 84.

In the configuration described above, each of the shroud flanges 82 is sandwiched by the corresponding first direction reinforcing rib 83a and the corresponding second direction reinforcing rib 84a from the both sides in the vehicle longitudinal direction, so as to effectively improve the strength of the shroud flange 82.

Further, as shown in FIG. 13, in each of the first direction reinforcing ribs 83a, the end coupled to the corresponding shroud flange 82 is located farther inward in the vehicle width direction than the outer end in the vehicle width direction of the shroud flange 82 (in other words, the first direction reinforcing rib 83a has a height smaller than the width of the shroud flange 82). Accordingly, the anteroposterior contact surface 82a of the shroud flange 82 that faces in the first direction is sufficiently secured.

On the other hand, in each of the second direction reinforcing ribs 84a, the end coupled to the corresponding shroud flange 82 is located farther outward in the vehicle width direction than the end of the corresponding first direction reinforcing rib 83a to be coupled to the shroud flange 82 (in other words, the second direction reinforcing rib 84a is set to be higher than the first direction reinforcing rib 83a). Accordingly, the strength of the shroud flange 82 is secured.

As shown in FIG. 7, the upper contact surface 85a and the anteroposterior contact surface 82a are preferably overlapped with each other in the vertical direction.

This configuration achieves secure sealing in the gap between the shroud 8 and the bonnet 5.

In the present embodiment, the first elastic sealing member 53 is brought into contact with the shroud flanges 82 in a state of being elastically deformed in the vehicle longitudinal direction when the bonnet 5 is located at the closed position.

More specifically, as shown in FIG. 11, the bonnet flange 52 is overlapped with the corresponding shroud flange 82 in a front view as viewed along the vehicle longitudinal direction when the bonnet 5 is located at the closed position.

Further, as shown in FIG. 11, the first elastic sealing member 53 has an attachment portion 533 and a contact portion 534. The attachment portion 533 has a U-letter shape in cross section and elastically sandwiches the bonnet flange 52. The contact portion 534 extends from the attachment portion 533 toward the shroud flanges 82 so as to be brought into contact with the anteroposterior contact surfaces 82a when the bonnet 5 is located at the closed position. The contact portion 534 is elastically deformable in the vehicle longitudinal direction.

This configuration achieves more secure contact between the first elastic sealing member 53 and the shroud flanges 82 when the bonnet 5 is located at the closed position, so that the sealing property of the first elastic sealing member 53 can be improved.

Figure 14:
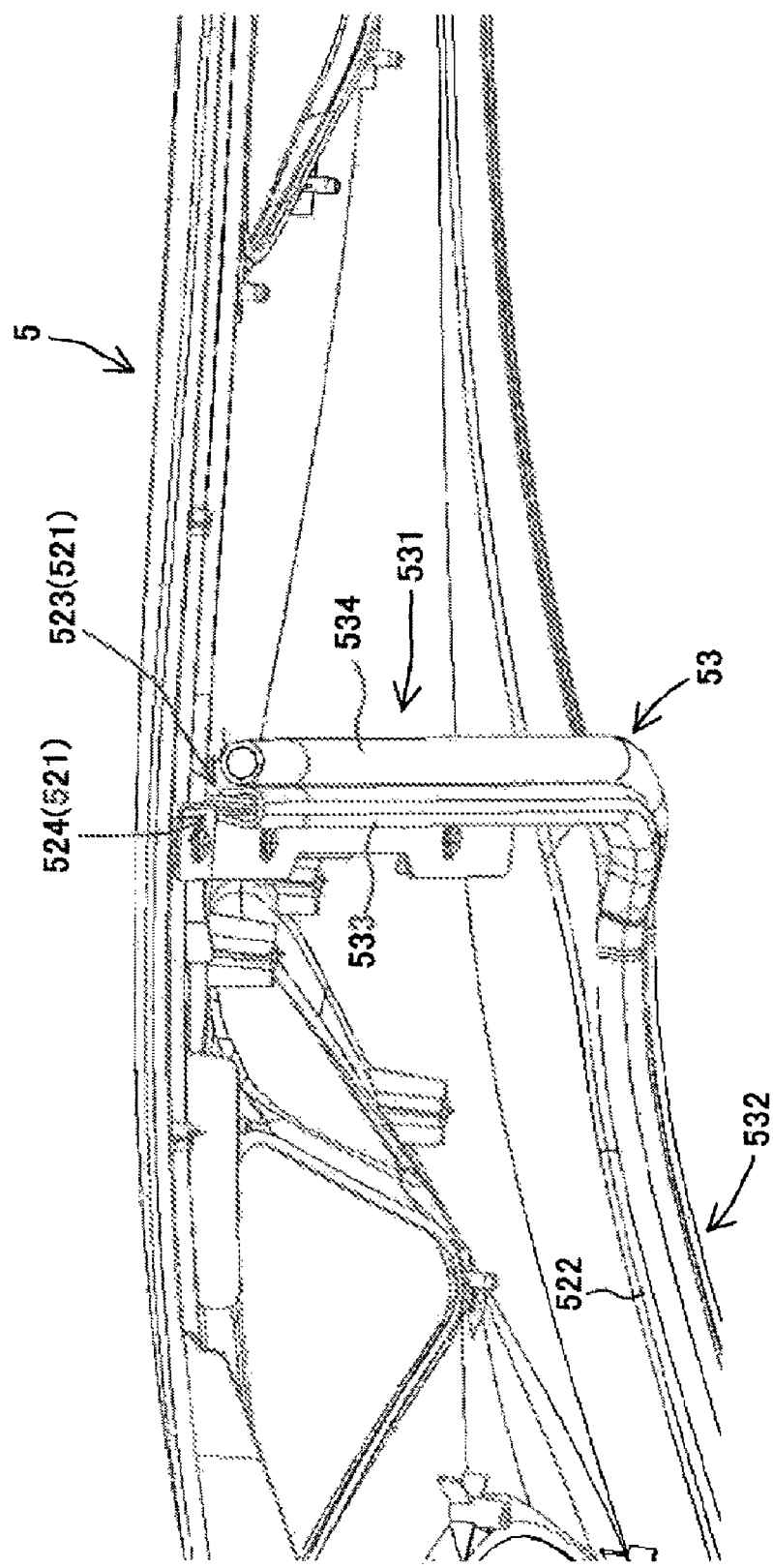
FIG. 14 is a horizontally cross-sectional plan view of an XIV portion shown in FIG. 9.

FIG. 14 is a horizontally cross-sectional plan view of an XIV portion shown in FIG. 9.

As shown in FIGS. 10 and 14, each of the shroud corresponding regions 521 in the bonnet flange 52 has a first flange 523 and a second flange 524. The first flange 523 is provided integrally with the bonnet 5 so as to extend inward from the inner peripheral surface of the bonnet 5. The second flange 524 is fixedly attached to the inner peripheral surface of the bonnet 5 so as to be overlapped with the first flange 523.

In the present embodiment, the second flange 524 is fixed to the inner peripheral surface of the bonnet 5 by a fastening member 525 such as a bolt.

The first elastic sealing member 53 is attached such that the attachment portion 533 sandwiches both the first flange 523 and the second flange 524.

Figure 15:
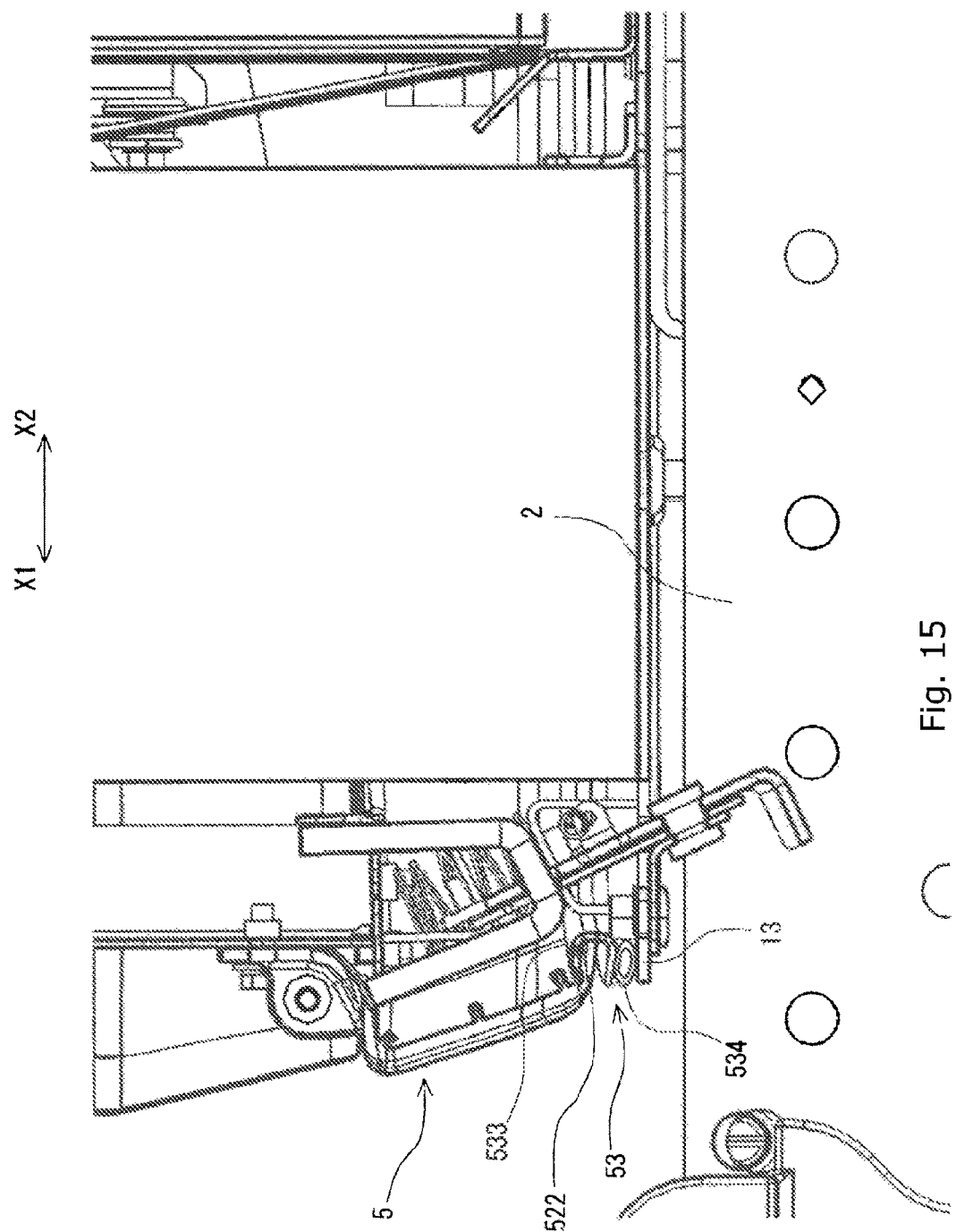
FIG. 15 is a vertically cross-sectional partial side view of a contact portion between the bonnet and a support plate as well as the vicinity thereof.

FIG. 15 is a vertically cross-sectional partial side view of the contact portion between the bonnet 5 and the support plate 13 as well as the vicinity thereof.

Figure 16:
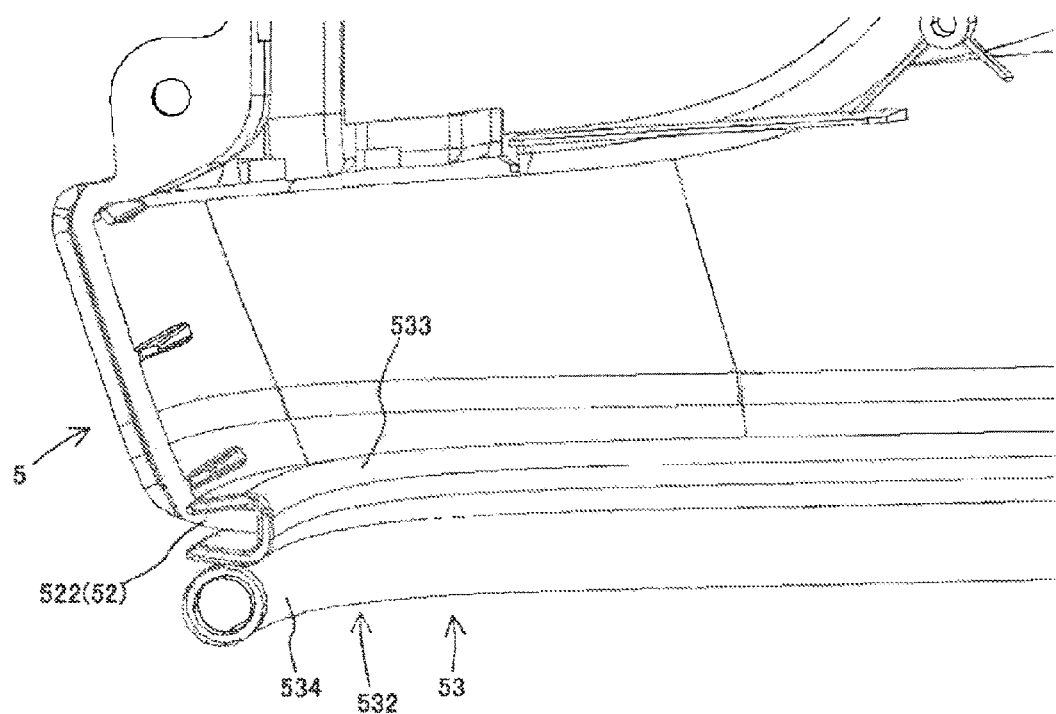
FIG. 16 is a vertically cross-sectional side view of the XIV portion shown in FIG. 9.

FIG. 16 is a vertically cross-sectional side view of the XIV portion shown in FIG. 9.

As shown in FIGS. 10, 15, and 16, the support plate corresponding region 522 of the bonnet flange 52 is formed integrally with the bonnet 5.

More specifically, a portion of the lower end of the bonnet 5 that faces the support plate 13 extends inside the bonnet and terminates to configure the support plate corresponding region 522.

The first elastic sealing member 53 is attached to the support plate corresponding region 522 via the attachment portion 533 in such a manner that the contact portion 534 extends toward the support plate 13.

It is noted that the configuration of the bonnet flange 52 is not limited to that described above as long as being capable of securely holding the first elastic sealing member 53.

More specifically, for example, the bonnet flange 52 can be configured such that each of the shroud corresponding regions 521 has only one of the first flange 523 and the second flange 524.

Alternatively, a member configuring the shroud corresponding regions 521 and the support plate corresponding region 522 can be fixed to the bonnet 5 by a fastening member such as a bolt and/or by welding.

Further, in the present embodiment, the shroud 8 has the shroud flanges 82 that are formed integrally with the shroud main body 81. Obviously, the shroud main body 81 and the shroud flanges 82 can be alternatively provided separately from each other.

FIGS. 17A to 17D are sectional views of the first elastic sealing members that are applicable to the bonnet structure according to the present invention. In these figures, FIG. 17A shows the first elastic sealing member 53 that is applied in the present embodiment.

In the present embodiment, as shown in FIG. 17A, the contact portion 534 of the first elastic sealing member 53 has a hollow circular or elliptical shape in cross section.

As shown in FIG. 17A, the attachment portion 533 has a main body portion 533a and a plurality of first detachment inhibiting portions 533b. The main body portion 533a has a U-letter shape in cross section. The first detachment inhibiting portions 533b extend inward from the inner peripheral surface of the main body portion 533a.

The main body portion 533a has a pair of side walls facing the respective surfaces of the bonnet flange 52 and an end wall for closing first ends of the pair of side walls, and the main body portion 533a is opened at second ends of the pair of side walls.

The first detachment inhibiting portions 533b are disposed on both sides of the bonnet flange 52 so as to be in contact with the respective surfaces of the bonnet flange 52 in the state where the detachment portion 533 is attached to the bonnet flange 52. Further, each of the first detachment inhibiting portions 533b is inclined in such a manner as to be positioned farther toward the direction in which the bonnet flange 52 is inserted as it extends from a proximal end toward a distal end.

The configuration described above makes it possible to easily attach the attachment portion 533 to the bonnet flange 52, and also effectively prevent the detachment of the first elastic sealing member 53 from the bonnet flange 52.

In the present embodiment, the attachment portion 533 is further provided with a second detachment inhibiting portion 533c that extends outward from the open end of the main body portion 533a.

The second detachment inhibiting portion 533c has an extending portion that extends from one of the pair of side walls of the main body portion along the side wall, and an inclined portion that extends from the distal end of the extending portion toward the other one of the pair of side walls.

The inclined portion is inclined in such a manner as to be positioned farther toward the direction in which the bonnet flange 52 is inserted as it extends from a proximal end to a distal end, similarly to the first detachment inhibiting portions 533b.

The above configuration further effectively prevents the detachment of the attachment portion 533 from the bonnet flange 52.

Further, in the present embodiment, the main body portion 533a interiorly has a metal core 537 that has a U-letter shape in cross section.

This configuration can prevents the deformation of the main body portion 533a while allowing the elastic deformation of the first detachment inhibiting portions 533b, the second detachment inhibiting portion 533c, and the contact portion 534.

The first elastic sealing member 53 can be integrally made of an elastic resin material such as rubber or urethane.

As shown in FIG. 17B, a first elastic sealing member 53b according to a first modification is provided with a contact portion 534b that has a claw shape in cross section. More specifically, the contact portion 534b is configured such that the peripheral wall of the hollow contact portion 534 of the first elastic sealing member 53 shown in FIG. 17A is partially cut out.

The contact portion 534b shown in FIG. 17B has a rectangular shape in cross section. Obviously, the contact portion 534b can alternatively be formed in a circular shape or an elliptical shape in cross section.

As shown in FIG. 17C, a first elastic sealing member 53c according to a second modification has a solid contact portion 534c. In particular, the solid contact portion 534c is preferably made of a material having a high forming factor (such as urethane foam).

The contact portion 534c is formed into a substantially rectangular in cross section having a flat surface that is in contact with the shroud flange 82 or the support plate 13. Obviously, the contact portion 534c can be alternatively formed into a circular shape or an elliptical shape in cross section.

As shown in FIG. 17D, a first elastic sealing member 53d according to a third modification is not provided with the attachment portion 533, but has an attachment layer 533d instead, which attaches the contact portion 534d directly to the bonnet flange 52.

The contact portion 534d is has a hollow and D-letter shape in cross section. Alternatively, the contact portion 534d can be formed in any one of the shapes shown in FIGS. 17A to 17C.

As shown in FIGS. 2 to 4, in the present embodiment, there is provided in front of the shroud 8 a filter 16 that removes impurities such as dust contained in the air imported into the shroud 8.

Further, mounted in front of the filter 16 is a battery 17, which is also supported by the support plate 13.

As shown in FIGS. 2 to 4, in the present embodiment, the air cleaner 9 is supported at the upper portion of the shroud 8 via a support member 18.

The embodiment of the present invention has been described as above. However, the present invention is not to be limited to the above embodiment, but can be improved, modified, and corrected in various ways as long as not departing from the spirit of the present invention.

For example, the shroud 8 and the support plate 13 may be formed integrally with each other.

DESCRIPTION OF THE REFERENCE NUMBERALS 1 working vehicle
3 engine
5 bonnet (hood)
5R first region in the vehicle width direction
5L second region in the vehicle width direction
5C central region in the vehicle width direction
6 radiator
7 cooling fan
8 shroud
9 air cleaner
10 intake pipe
13 support plate
15 exhaust silencer
51 rotary shaft
52 bonnet flange
521 shroud corresponding region
522 support plate corresponding region
53, 53b, 53c, 53d first elastic sealing member
531 shroud contact region
532 support plate contact region
533 attachment portion
534, 534b, 534c, 534d contact portion
54 second elastic sealing member
81 shroud main body
81a opening
82 shroud flange
82a anteroposterior contact surface
83 reinforcing flange
83a first direction reinforcing rib
85 upper flange
85a upper contact surface
850 concave portion
851 vertical surface
852 horizontal surface
X1 first side in the vehicle longitudinal direction (first direction)
BC reference curve shape

The invention claimed is:

1. A bonnet structure applicable to a working vehicle including a radiator, a cooling fan and an engine, which are disposed in order from a front to a rear of the vehicle, a shroud that surrounds the cooling fan, an air cleaner that is disposed in front of the shroud, an intake pipe that has a first end connected to the air cleaner and a second end connected to an inlet port of the engine, and a bonnet that is rotatable about a rotary shaft along a vehicle width direction so as to be located at a closed position for covering these members and at an opened position for exposing these members, wherein the shroud includes a shroud main body provided with an opening that surrounds the cooling fan, and a pair of shroud flanges that respectively extend outward in the vehicle width direction from side surfaces of the shroud main body, each of the shroud flanges having an anteroposterior contact surface that is directed to a first direction, which is opposite to the rotary shaft in the vehicle longitudinal direction, wherein the bonnet is provided with a bonnet flange that extends inward from an inner peripheral surface of the bonnet, and a first elastic sealing member that is attached to the bonnet flange, wherein the bonnet flange is provided to the bonnet so as to be positioned farther toward the first direction than the pair of shroud flanges when the bonnet is located at the closed position, wherein the first elastic sealing member is brought from the first direction into contact with the anteroposterior contact surface when the bonnet is rotated about the rotary shaft from the opened position to the closed position, wherein each of the pair of shroud flanges is inclined so as to be positioned farther toward the first direction as it extends downward, and wherein the bonnet flange is inclined correspondingly to the shroud flange.

2. A bonnet structure according to claim 1, wherein the bonnet flange is overlapped with the pair of shroud flanges in a front view as viewed along the vehicle longitudinal direction when the bonnet is located at the closed position, wherein the first elastic sealing member includes an attachment portion that has a U-letter shape in cross section and elastically sandwiches the bonnet flange, and a contact portion that extends from the attachment portion toward the shroud flanges so as to be brought into contact with the anteroposterior contact surfaces when the bonnet is located at the closed position, and wherein the contact portion is elastically deformable with respect to a direction in which the contact portion extends from the attachment portion.

3. A bonnet structure according to claim 1, wherein the shroud includes an upper flange that extends from an upper end of one of the pair of shroud flanges to an upper end of the other one of the pair of shroud flanges so as to pass over an upper end of the shroud main body, the upper flange having an upper contact surface that faces upward, wherein the bonnet is provided with a second elastic sealing member on the inner peripheral surface, and wherein the second elastic sealing member is brought from above into direct or indirect contact with the upper contact surface when the bonnet is rotated around the rotary shaft from the opened position to the closed position.

4. A bonnet structure according to claim 1, wherein the rotary shaft is disposed farther rearward than the engine so that the first direction is set to the forward direction, wherein the radiator is supported by a support plate extending substantially horizontally, wherein the bonnet flange has a pair of shroud corresponding regions that correspond to the pair of the shroud flanges, and a support plate corresponding region that faces the support plate when the bonnet is located at the closed position, and wherein the first elastic sealing member has a pair of shroud contact regions and a support plate contact region, the pair of shroud contact regions being attached to the pair of shroud corresponding regions, respectively, and brought into contact with the anteroposterior contact surfaces when the bonnet is located at the closed position, the support plate contact region being attached to the support plate corresponding region and brought from above into contact with an upper surface of the support plate when the bonnet is rotated from the opened position to the closed position.

5. A bonnet structure according to claim 3, wherein the upper contact surface includes a concave portion that is positioned on one side in the vehicle width direction and is opened upward, the concave portion allowing the intake pipe to extend in the vehicle longitudinal direction across the shroud, and wherein the second elastic sealing member is brought from above into contact with the intake portion with respect to a portion of the upper contact surface at which the concave portion is formed.

6. A bonnet structure according to claim 3, wherein the upper contact surface and the anteroposterior contact surfaces are overlapped with each other in the vertical direction.

7. A bonnet structure applicable to a working vehicle including a radiator, a cooling fan and an engine, which are disposed in order from a front to a rear of the vehicle, a shroud that surrounds the cooling fan, an air cleaner that is disposed in front of the shroud, an intake pipe that has a first end connected to the air cleaner and a second end connected to an inlet port of the engine, and a bonnet that is rotatable about a rotary shaft along a vehicle width direction so as to be located at a closed position for covering these members and at an opened position for exposing these members, wherein the shroud, includes a shroud main body provided with an opening that surrounds the cooling fan, and a pair of shroud flanges that respectively extend outward in the vehicle width, direction from side surfaces of the shroud main body, each of the shroud flanges having an anteroposterior contact surface that is directed to a first direction, which is opposite to the rotary shaft in the vehicle longitudinal direction, wherein the bonnet is provided with a bonnet flange that extends inward from an inner peripheral surface of the bonnet and a first elastic sealing member that is attached to the bonnet flange, wherein the bonnet flange is provided to the bonnet so as to be positioned farther, toward, the first direction than the pair of shroud flanges when the bonnet is located at the closed position, wherein the first elastic sealing member is brought from the first direction into contact with the anteroposterior contact surface when the bonnet is rotated about the rotary shaft from the opened position to the closed position, wherein the shroud has a pair of right and left reinforcing flanges that extend in the first direction from the respective side surfaces of the shroud main body, and first direction reinforcing ribs that couple the shroud flanges to the corresponding reinforcing flanges, and wherein each of the first direction reinforcing ribs has an end in the first direction that is formed into such a tapered shape as to be positioned farther inward in the vehicle width direction as it extends toward the first direction.

8. A bonnet structure applicable to a working vehicle including a radiator, a cooling fan and an engine, which are disposed in order from a front to a rear of the vehicle, a shroud that surrounds the cooling fan, an air cleaner that is disposed in front of the shroud, an intake pipe that has a first end connected to the air cleaner and a second end connected to an inlet port of the engine, an exhaust silencer that has a first end connected to an outlet port of the engine, and a bonnet that is rotatable about a rotary shaft along a vehicle width direction so as to be located at a closed position for covering these members and at an opened position for exposing these members, wherein the intake pipe and the exhaust silencer are disposed above the engine and are separately from each other so as to be on first and second sides in the vehicle width direction, respectively, wherein the intake pipe extends in a vehicle longitudinal direction above and across the shroud, and wherein an upper surface of the bonnet includes a first region in the vehicle width direction and a second region in the vehicle width direction that faces the intake pipe and the exhaust silencer, respectively, and a central region in the vehicle width direction, the first and second regions extending along a reference curve shape having a center in the vehicle width direction that is located at a highest position, the central region being concaved downward from the reference curve shape.

9. A bonnet structure according to claim 8, wherein the bonnet is provided with an elastic sealing member on a portion of its inner peripheral surface that faces the shroud, wherein an upper surface of the shroud is configured so that a region on the first side in the vehicle width direction forms a concave portion that is concaved downward from the remaining region, the concave portion being defined by a vertical surface and a horizontal surface, the vertical surface extending downward from a first end in the vehicle width direction of a center region in the vehicle width direction, the horizontal surface extending from a lower end of the vertical surface toward the first side in the vehicle width direction, wherein the intake pipe passes through the concave portion formed at the upper surface of the shroud so as to extend in the vehicle longitudinal direction across the shroud, and wherein a portion of the intake pipe that is located in the concave portion has an upper surface that is inclined so as to be positioned downward as it extends toward outward in the vehicle width direction.

* * * * *

UNITED STATES PATENT AND TRADEMARK OFFICE
CERTIFICATE OF CORRECTION

PATENT NO. : 8,371,408 B2
APPLICATION NO. : 13/143885
DATED : February 12, 2013
INVENTOR(S) : Shinya Kawashiri et al.

Page 1 of 1

It is certified that error appears in the above-identified patent and that said Letters Patent is hereby corrected as shown below:

In the Specifications:

Column 1, line 37: "engine thereby to be wormed" should read --engine thereby to be warmed--

Column 1, line 59: "by the shroud since" should read --by the shroud--

Column 2, line 3: "in such a configuration" should read --In such a configuration--

Column 2, line 22: "of the of the shroud" should read --of the shroud--

Column 16, line 17: "configuration can prevents" should read --configuration can prevent--

Column 16, line 51: "is has a hollow" should read --is hollow--

Column 17, line 5: "NUMBERALS" should read --NUMERALS--

In the Claims:

Column 19, in Claim 7, line 21: "wherein the shroud, includes" should be --wherein the shroud includes--

Column 19, in Claim 7, line 34: "positioned farther, toward, the first" should be --positioned farther toward the first--

Signed and Sealed this
Seventh Day of May, 2013

Teresa Stanek Rea
*Acting Director of the United States Patent and Trademark Office*